US011946223B2

(12) United States Patent
Sakuta et al.

(10) Patent No.: US 11,946,223 B2
(45) Date of Patent: Apr. 2, 2024

(54) SHOVEL

(71) Applicant: SUMITOMO CONSTRUCTION MACHINERY CO., LTD., Tokyo (JP)

(72) Inventors: Sou Sakuta, Chiba (JP); Takeya Izumikawa, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 661 days.

(21) Appl. No.: 17/025,169

(22) Filed: Sep. 18, 2020

(65) Prior Publication Data

US 2021/0002863 A1 Jan. 7, 2021

Related U.S. Application Data

(63) Continuation of application No. PCT/JP2019/012898, filed on Mar. 26, 2019.

(30) Foreign Application Priority Data

Mar. 26, 2018 (JP) .................................. 2018-058913

(51) Int. Cl.
E02F 9/20 (2006.01)
B60R 1/00 (2022.01)
(Continued)

(52) U.S. Cl.
CPC .............. *E02F 9/2033* (2013.01); *B60R 1/00* (2013.01); *E02F 9/123* (2013.01); *E02F 9/2271* (2013.01);
(Continued)

(58) Field of Classification Search
CPC ... E02F 3/32; E02F 3/435; E02F 9/123; E02F 9/2004; E02F 9/2033; E02F 9/205;
(Continued)

(56) References Cited

U.S. PATENT DOCUMENTS 5,198,800 A * 3/1993 Tozawa ................. E02F 9/2033
340/685
5,490,081 A * 2/1996 Kuromoto ................. E02F 9/24
340/685
(Continued)

FOREIGN PATENT DOCUMENTS

JP H07-292708 11/1995
JP H08-027841 1/1996
(Continued)

OTHER PUBLICATIONS

International Search Report for PCT/JP2019/012898 dated May 7, 2019.

Primary Examiner — Tyler J Lee
(74) Attorney, Agent, or Firm — IPUSA, PLLC

(57) ABSTRACT

A shovel includes a lower traveling body, an upper turning body turnably attached to the lower traveling body, an actuator mounted on the lower traveling body or the upper turning body, and a controller configured to set a prohibited area for an obstacle located in a work area and restrict movement of the actuator. The controller determines whether the shovel has entered the prohibited area, and slows or stops movement of the shovel in response to determining that the shovel enters the prohibited area.

15 Claims, 20 Drawing Sheets

(51) Int. Cl.
*E02F 9/12* (2006.01)
*E02F 9/22* (2006.01)
*E02F 9/24* (2006.01)
*E02F 9/26* (2006.01)
*E02F 3/32* (2006.01)
*G06T 11/20* (2006.01)

(52) U.S. Cl.
CPC ............... *E02F 9/24* (2013.01); *E02F 9/262* (2013.01); *B60R 2300/105* (2013.01); *B60R 2300/301* (2013.01); *E02F 3/32* (2013.01); *E02F 9/2004* (2013.01); *E02F 9/2228* (2013.01); *E02F 9/2285* (2013.01); *E02F 9/2292* (2013.01); *E02F 9/2296* (2013.01); *G06T 11/20* (2013.01)

(58) Field of Classification Search
CPC ..... E02F 9/2228; E02F 9/2271; E02F 9/2285; E02F 9/2292; E02F 9/2296; E02F 9/24; E02F 9/245; E02F 9/262; B60R 1/00; B60R 2300/105; B60R 2300/301; G06T 11/20; H04N 7/18
See application file for complete search history.

(56) References Cited

U.S. PATENT DOCUMENTS

| | | | |
|---|---|---|---|
| 5,822,891 A | 10/1998 | Fujishima et al. | |
| 6,539,294 B1 | 3/2003 | Kageyama | |
| 8,150,103 B2* | 4/2012 | Zhang | G06V 20/40 382/173 |
| 8,248,263 B2* | 8/2012 | Shervey | G07C 9/28 340/8.1 |
| 9,334,630 B2* | 5/2016 | Kim | H04N 7/18 |
| 9,380,741 B2* | 7/2016 | Drew | G07C 5/08 |
| 9,556,593 B2 | 1/2017 | Nomura et al. | |
| 9,695,982 B2* | 7/2017 | Rivet | F16P 3/147 |
| 10,127,449 B2* | 11/2018 | Pestun | G08G 5/0052 |
| 10,323,386 B2* | 6/2019 | Kiyota | G08B 13/19602 |
| 10,346,687 B2* | 7/2019 | Pestun | G06T 17/05 |
| 10,527,731 B2* | 1/2020 | Kinoshita | G01S 17/931 |
| 10,648,159 B2* | 5/2020 | Kaiso | E02F 3/32 |
| 10,876,273 B2* | 12/2020 | Kozui | E02F 9/24 |
| 11,149,407 B2* | 10/2021 | Graves | G08G 1/166 |
| 2008/0133128 A1 | 6/2008 | Koch | |
| 2009/0060277 A1* | 3/2009 | Zhang | G06V 20/40 375/E7.076 |
| 2013/0088593 A1* | 4/2013 | Ishimoto | E02F 9/261 348/143 |
| 2014/0343820 A1* | 11/2014 | Kim | E02F 9/24 701/99 |
| 2014/0354813 A1* | 12/2014 | Ishimoto | E02F 9/24 348/148 |
| 2014/0371979 A1* | 12/2014 | Drew | G01C 21/3407 701/418 |
| 2015/0142276 A1* | 5/2015 | Wu | E02F 9/2095 701/50 |
| 2015/0343976 A1* | 12/2015 | Lim | E02F 9/261 340/435 |
| 2018/0209122 A1* | 7/2018 | Kiyota | E02F 9/262 |
| 2018/0218214 A1* | 8/2018 | Pestun | G06T 17/05 |
| 2018/0245315 A1* | 8/2018 | Kaiso | E02F 9/261 |
| 2018/0260626 A1* | 9/2018 | Pestun | G08G 5/0069 |
| 2018/0274206 A1* | 9/2018 | Kozui | E02F 9/262 |
| 2019/0017246 A1* | 1/2019 | Okada | E02F 3/32 |
| 2019/0170879 A1* | 6/2019 | Kinoshita | G01B 21/047 |

FOREIGN PATENT DOCUMENTS

| | | |
|---|---|---|
| JP | H11-296229 | 10/1999 |
| JP | 2002-328022 | 11/2002 |
| JP | 3679848 | 8/2005 |
| JP | 4996928 | 8/2012 |
| JP | 2013-151830 | 8/2013 |
| JP | 2014-098270 | 5/2014 |

* cited by examiner

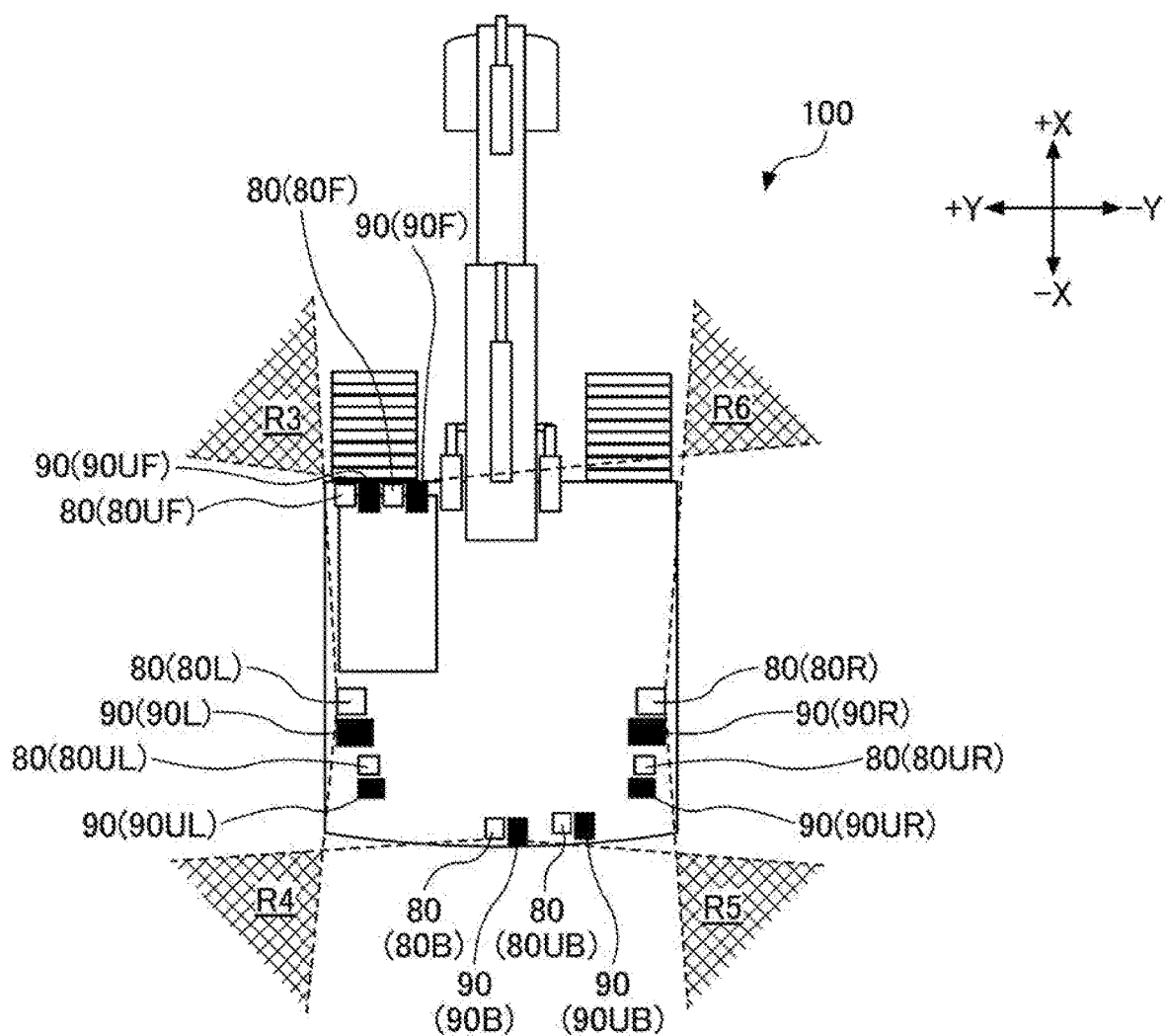

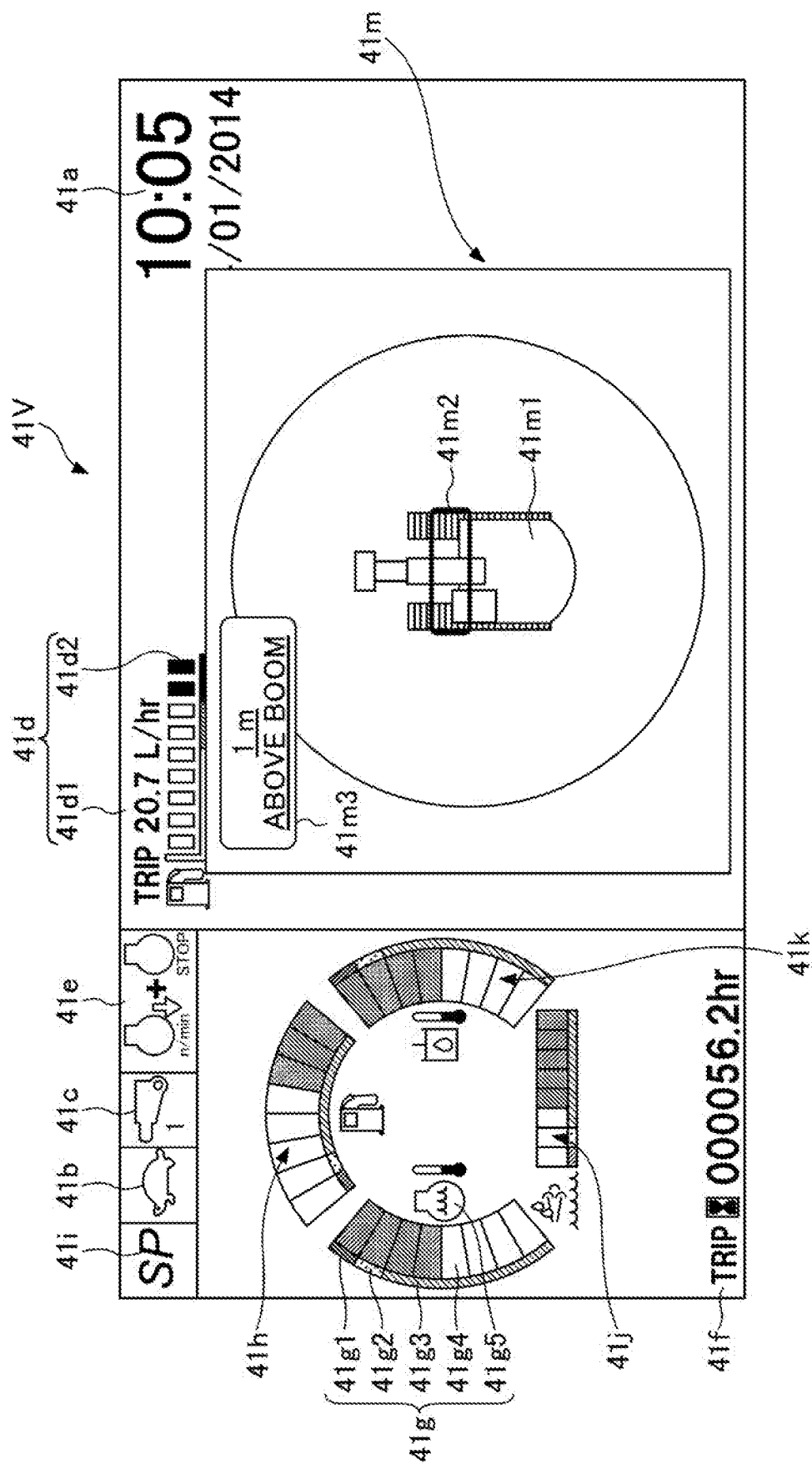

SHOVEL

CROSS-REFERENCE TO RELATED APPLICATION

The present application is a continuation of International Application No. PCT/JP2019/012898, filed on Mar. 26, 2019, which claims priority to Japanese Application No. JP2018-058913, filed on Mar. 26, 2018, the entire content of each of which is incorporated herein by reference.

BACKGROUND

Technical Field

The disclosures herein relate to a shovel.

Description of Related Art

A work machine that detects underground objects is known. If the attachment is likely to collide with an underground object, the work machine controls the attachment to slow or stop its movement, or avoid the underground object.

SUMMARY

According to an embodiment of the present invention, a shovel includes a lower traveling body, an upper turning body turnably attached to the lower traveling body, an actuator mounted on the lower traveling body or the upper turning body, and a controller configured to set a prohibited area for an obstacle located in a work area and restrict movement of the actuator. The controller determines whether the shovel has entered the prohibited area, and slows or stops movement of the shovel in response to determining that the shovel enters the prohibited area.

BRIEF DESCRIPTION OF THE DRAWINGS

Other objects and further features of the present invention will be apparent from the following detailed description when read in conjunction with the accompanying drawings, in which:

FIG. 1D is a top view of the example of the shovel according to the embodiment of the present invention;

FIG. 17 is a diagram illustrating yet another example image displayed during the prohibited area setting process.

DETAILED DESCRIPTION

Figure 1A:
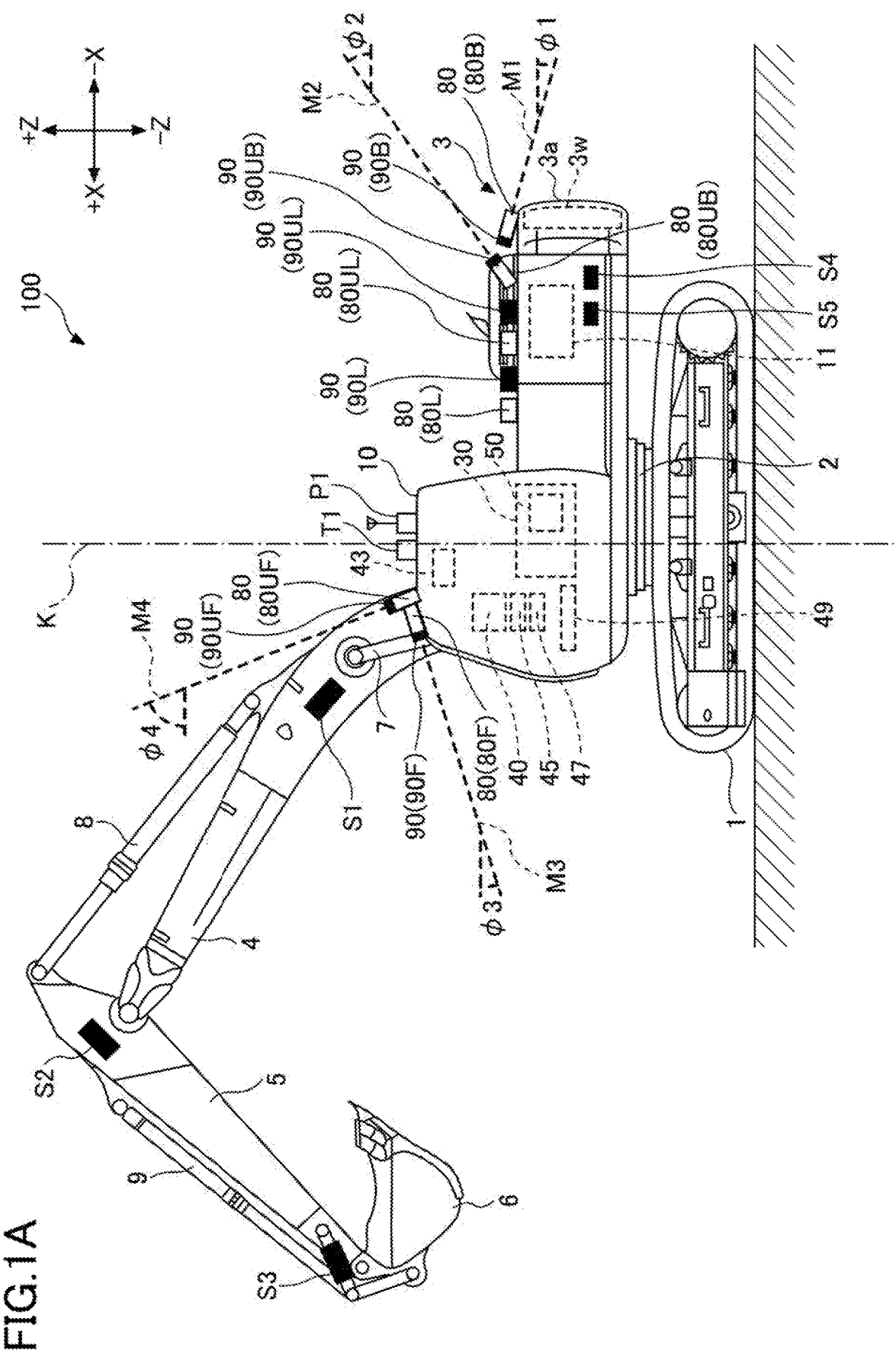
FIG. 1A is a side view of an example of a shovel according to an embodiment of the present invention.

At a work site, there may be obstacles such as utility poles and power lines in addition to underground objects. Therefore, the operator of a shovel needs to pay attention to such obstacles while operating the shovel. As a result, work efficiency is impaired.

In view of the above, it is desirable to provide a shovel that can improve work efficiency.

In the following, embodiments of the present invention will be described with reference to the accompanying drawings. In the drawings, the same or corresponding elements are denoted by the same reference numerals and a duplicate description thereof may be omitted.

Figure 1B:
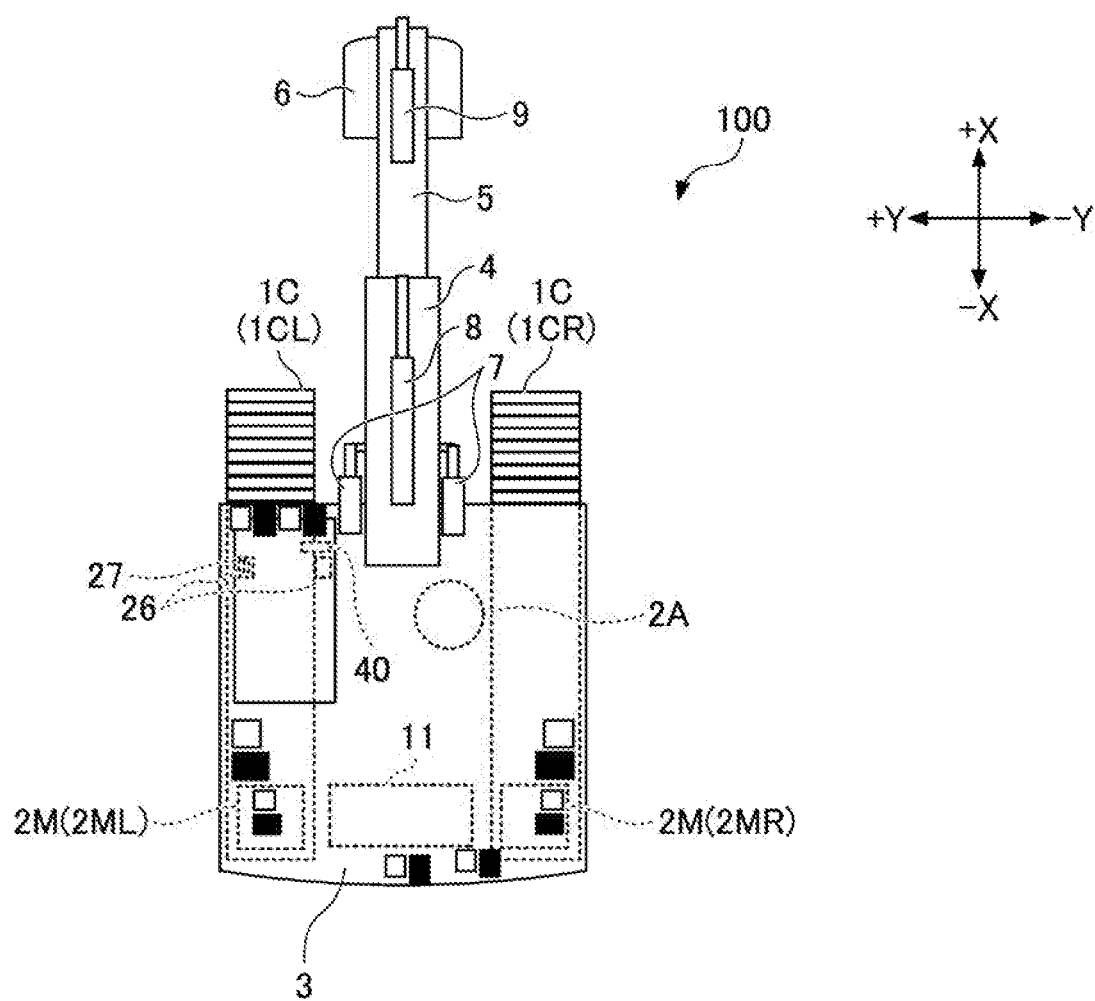
FIG. 1B is a top view of the example of the shovel according to the embodiment of the present invention.

First, the overall configuration of an example of a shovel 100 according to an embodiment of the present invention will be described with reference to FIG. 1A through FIG. 10. FIG. 1A and FIG. 10 are side views of an example of the shovel 100 according to the embodiment of the present invention. FIG. 1B and FIG. 1D are top views of the example of the shovel 100 according to the embodiment of the present invention. FIG. 1A is the same as FIG. 10 except for reference numerals and auxiliary lines, and FIG. 1B is the same as FIG. 1D except for reference numerals and auxiliary lines.

In the present embodiment, the shovel 100 includes hydraulic actuators. The hydraulic actuators include a left traveling hydraulic motor 2ML, a right traveling hydraulic motor 2MR, a turning hydraulic motor 2A, a boom cylinder 7, an arm cylinder 8, and a bucket cylinder 9.

A lower traveling body 1 of the shovel 100 includes crawlers 1C. The crawlers 10 are driven by traveling hydraulic motors 2M mounted on the lower traveling body 1. Specifically, the crawlers 10 include a left crawler 1CL and a right crawler 1CR. The left crawler 1CL is driven by a left traveling hydraulic motor 2ML, and the right crawler 1CR is driven by a right traveling hydraulic motor 2MR.

An upper turning body 3 is turnably mounted on the lower traveling body 1 of the shovel 100 via a turning mechanism 2. A boom 4 is mounted on the upper turning body 3. An arm 5 is attached to the end of the boom 4, and a bucket 6, which serves as an end attachment (working portion), is attached to the end of the arm 5. As the end attachment, a slope bucket, a dredging bucket, or a breaker may be attached.

The boom 4, the arm 5, and the bucket 6 constitute an excavation attachment AT, which is an example of an attachment, and are hydraulically driven by the boom cylinder 7, the arm cylinder 8, and the bucket cylinder 9, respectively. A boom angle sensor S1 is attached to the boom 4, and an arm angle sensor S2 is attached to the arm 5. A bucket angle sensor S3 is attached to the bucket 6. The excavation attachment may have a bucket tilt mechanism. The boom angle sensor S1, the arm angle sensor S2, and the bucket angle sensor S3 may be referred to as "orientation sensors".

The boom angle sensor S1 detects the rotation angle of the boom 4. For example, the boom angle sensor S1 may be an acceleration sensor that detects the rotation angle of the boom 4 relative to the upper turning body 3 by detecting the inclination of the boom 4 relative to a horizontal plane.

The arm angle sensor S2 detects the rotation angle of the arm 5. For example, the arm angle sensor S2 may be an acceleration sensor that detects the rotation angle of the arm 5 relative to the boom 4 by detecting the inclination of the arm 5 relative to a horizontal plane.

The bucket angle sensor S3 detects the rotation angle of the bucket 6. For example, the bucket angle sensor S3 may be an acceleration sensor that detects the rotation angle of the bucket 6 relative to the arm 5 by detecting the inclination of the bucket 6 relative to a horizontal plane.

If the excavation attachment has the bucket tilt mechanism, the bucket angle sensor S3 additionally detects the rotation angle of the bucket 6 around the tilt axis. The boom angle sensor S1, the arm angle sensor S2, and the bucket angle sensor S3 may each be a potentiometer using a variable resistor, a stroke sensor that detects the amount of stroke of a corresponding hydraulic cylinder, or a rotary encoder that detects the rotation angle around a connecting pin.

The upper turning body 3 includes a power source such as an engine 11, a counterweight 3w, a body inclination sensor S4, and a turning angular velocity sensor S5, which are covered by a cover 3a. The body inclination sensor S4 detects the inclination angle of the upper turning body 3. For example, the body inclination sensor S4 may be an acceleration sensor that detects the inclination angle of the upper turning body 3 by detecting the inclination of the upper turning body 3 relative to a horizontal plane. The turning angular velocity sensor S5 detects the turning angular velocity of the upper turning body 3. In the present embodiment, the turning angular velocity sensor S5 is a gyro sensor. The turning angular velocity sensor S5 may be a resolver or a rotary encoder. The turning angular velocity sensor S5 may detect the turning speed of the upper turning body 3. The turning speed may be calculated from the turning angular velocity.

A cabin 10 is mounted on the upper turning body 3. An operation device 26, a controller 30, a display device 40, an audio output device 43, an input device 45, a storage device 47, and a gate lock lever 49 are provided within the cabin 10.

The controller 30 functions as a main control unit that controls the driving of the shovel 100. The controller 30 is configured by an arithmetic processing unit including a CPU and an internal memory. Various functions of the controller 30 are implemented by the CPU executing programs stored in the internal memory. The controller 30 also functions as a machine guidance device 50 that guides the operation of the shovel 100.

The machine guidance device 50 performs a machine guidance function, and guides the operation of the shovel 100. In the present embodiment, the machine guidance device 50 indicates, to an operator, work information such as the distance between a target construction surface, which is a target ground surface set by the operator, and the working portion of the attachment. The target construction surface may be set in a reference coordinate system. For example, the reference coordinate system may be the World Geodetic System. The World Geodetic System is a three-dimensional orthogonal XYZ coordinate system in which the origin is at the center of gravity of the earth, the X-axis passes through the intersection of the Greenwich meridian and the equator, the Y-axis passes through 90 degrees east longitude, and the Z-axis passes through the north pole. Further, any point at a construction site may be determined as a reference point, and the target construction surface may be set based on a relative positional relationship with the reference point. For example, the distance between the target construction surface and the working portion of the attachment may be the distance between the target construction surface and the end (tip) of the bucket 6, which serves as an end attachment, the back surface of the bucket 6, or the edge of the breaker, which serves as an end attachment. The machine guidance device 50 indicates work information to the operator via the display device 40, audio output device 43, or the like, and guides the operation of the shovel 100.

The machine guidance device 50 may perform a machine control function to automatically assist the operation of the shovel by the operator. For example, during an excavating operation by the operator, the machine guidance device 50 assists the movements of the boom 4, the arm 5, and the bucket 6 such that the target construction surface coincides with the end position of the bucket 6. More specifically, for example, during an arm closing operation by the operator, the machine guidance device 50 automatically extends or retracts at least one of the boom cylinder 7 and the bucket cylinder 9 such that the target construction surface coincides with the end position of the bucket 6. In this case, by operating a single operating lever, the operator can perform excavation work while simultaneously moving the boom 4, the arm 5, and the bucket 6 such that the target construction surface coincides with the end position of the bucket 6.

In the present embodiment, the machine guidance device 50 is included in the controller 30; however, the machine guidance device 50 and the controller 30 may be separately provided. In this case, the machine guidance device 50 is configured by an arithmetic processing unit including a CPU and an internal memory, similar to the controller 30. Various functions of the machine guidance device 50 are implemented by the CPU executing programs stored in the internal memory.

The display device 40 outputs an image including various types of work information in response to a command from the machine guidance device 50. For example, the display device 40 may be an in-vehicle liquid crystal display directly connected to the machine guidance device 50.

The audio output device 43 outputs various types of audio information in response to an audio output command from the machine guidance device 50. For example, the audio output device 43 may be an in-vehicle speaker connected to the machine guidance device 50. Note that the audio output device D2 may be an alarm such as a buzzer.

The input device 45 is a device used by the operator of the shovel 100 to input various types of information into the machine guidance device 50. For example, the input device 45 may be configured to include a membrane switch attached to the surface of the display device 40. Further, the input device 45 may be configured to include a touch panel.

The storage device 47 is a device that stores various types of information. For example, the storage device 47 may be a non-volatile storage medium such as a semiconductor memory. The storage device 47 stores various types of information output from devices, such as the controller 30 including the machine guidance device 50.

The gate lock lever 49 is disposed between the door of the cabin 10 and the operator's seat. The gate lock lever 49 is a mechanism that prevents the shovel 100 from being erroneously operated. When the operator is seated in the operator's seat and pulls up the gate lock lever 49, the operator becomes unable to exit the cabin 10 and various operation devices become operable. When the operator pushes down the gate lock lever 49, the operator becomes able to exit the cabin 10 and the various operation devices become inoperable.

The upper turning body 3 and the cabin are provided with an image capturing device 80, which serves as an imaging means. The image capturing device 80 is an example of a surroundings monitoring device, and is configured to monitor the surroundings of the shovel 100. The image capturing device 80 includes a rear camera 80B and an upper rear camera 80UB, attached to the rear end of the upper surface of the upper turning body 3, a front. camera 80F and an upper front camera 80UF, attached to the front end of the upper surface of the cabin 10, a left camera 80L and an upper left camera 80UL, attached to the left end of the upper surface of the upper turning body 3, and a right camera 80R and an upper right camera 80UR, attached to the right end of the upper surface of the upper turning body 3. For example, each of the rear camera 80B, the upper rear camera 80UB, the front camera 80F, the upper front camera 80UF, the left camera 80L, the upper left camera 80UL, the right camera 80R, and the upper right camera 80UR may be a digital camera that includes an image capturing device such as a charge-coupled device (CCD) or a complementary metal-oxide semiconductor (CMOS), and transmits a captured image to the display device 40 provided in the cabin 10.

The rear camera 80B is configured to capture an image of a space behind and obliquely below the shovel 100. The upper rear camera 80UB is configured to capture an image of a space behind and obliquely above the shovel 100. The front camera 80F is configured to capture an image of a space in front of and obliquely below the shovel 100. The upper front camera 80UF is configured to capture an image of a space in front of and obliquely above the shovel 100. The left camera 80L is configured to capture an image of a space to the left of and obliquely below. the shovel 100. The upper left camera 80UL is configured to capture an image of a space to the left of and obliquely above the shovel 100. The right camera 80R is configured to capture an image of a space to the right of and obliquely below the shovel 100. The upper right camera 80UR is configured to capture an image of a space to the right of and obliquely above the shovel 100.

Specifically, as illustrated in FIG. 1A, the rear camera 80B is configured such that a dashed line M1, which is a virtual line representing the optical axis, forms an angle (angle of depression) φ1 with respect to a virtual plane (in the example of FIG. 1A, a virtual horizontal plane) that is perpendicular to a turning axis K. The upper rear camera 80UB is configured such that a dashed line M2, which is a virtual line representing the optical axis, forms an angle (angle of elevation) φ2 with respect to the virtual plane that is perpendicular to the turning axis K. The front camera 80F is configured such that a dashed line φ3, which is a virtual line representing the optical axis, forms an angle (angle of depression) 93 with respect to the virtual plane that is perpendicular to the turning axis K. The upper front camera 80UF is configured such that a dashed line M4, which is a virtual line representing the optical axis, forms an angle (angle of elevation) φ4 with respect to the virtual plane that is perpendicular to the turning axis K. Although not illustrated, the left camera 80L and the right camera 80R are configured such that the optical axis of each of the left camera 80L and the right camera 80R forms an angle of depression with respect to the virtual plane that is perpendicular to the turning axis K, and the upper left camera 80UL and the upper right camera 80UR are configured such that the optical axis of each of the upper left camera 80UL and the upper right camera 80UR forms an angle of elevation with respect to the virtual plane that is perpendicular to the turning axis K.

In FIG. 10, an area R1 represents a range in which a monitoring range (imaging range) of the front camera 80F overlaps an imaging range of the upper front camera 80UF, and an area R2 represents a range in which an imaging range of the rear camera 80B overlaps an imaging range of the upper rear camera 80UB. That is, the rear camera 80B and the upper rear camera 80UB are arranged such that the imaging ranges of the rear camera 80B and the upper rear camera 80UB partially overlap in the vertical direction, and the front camera 80F and the upper front camera 80UF are arranged such that the imaging ranges of the front camera 80F and the upper front camera 80UF partially overlap in the vertical direction. Further, although not illustrated, the left camera 80L and the upper left camera 80UL are arranged such that the imaging ranges of the left camera 80L and the upper left camera 80UL partially overlap in the vertical direction, and the right camera 80R and the upper right camera 80UR are arranged such that the imaging ranges of the right camera 80R and the upper right camera 80UR partially overlap in the vertical direction.

Figure 1C:
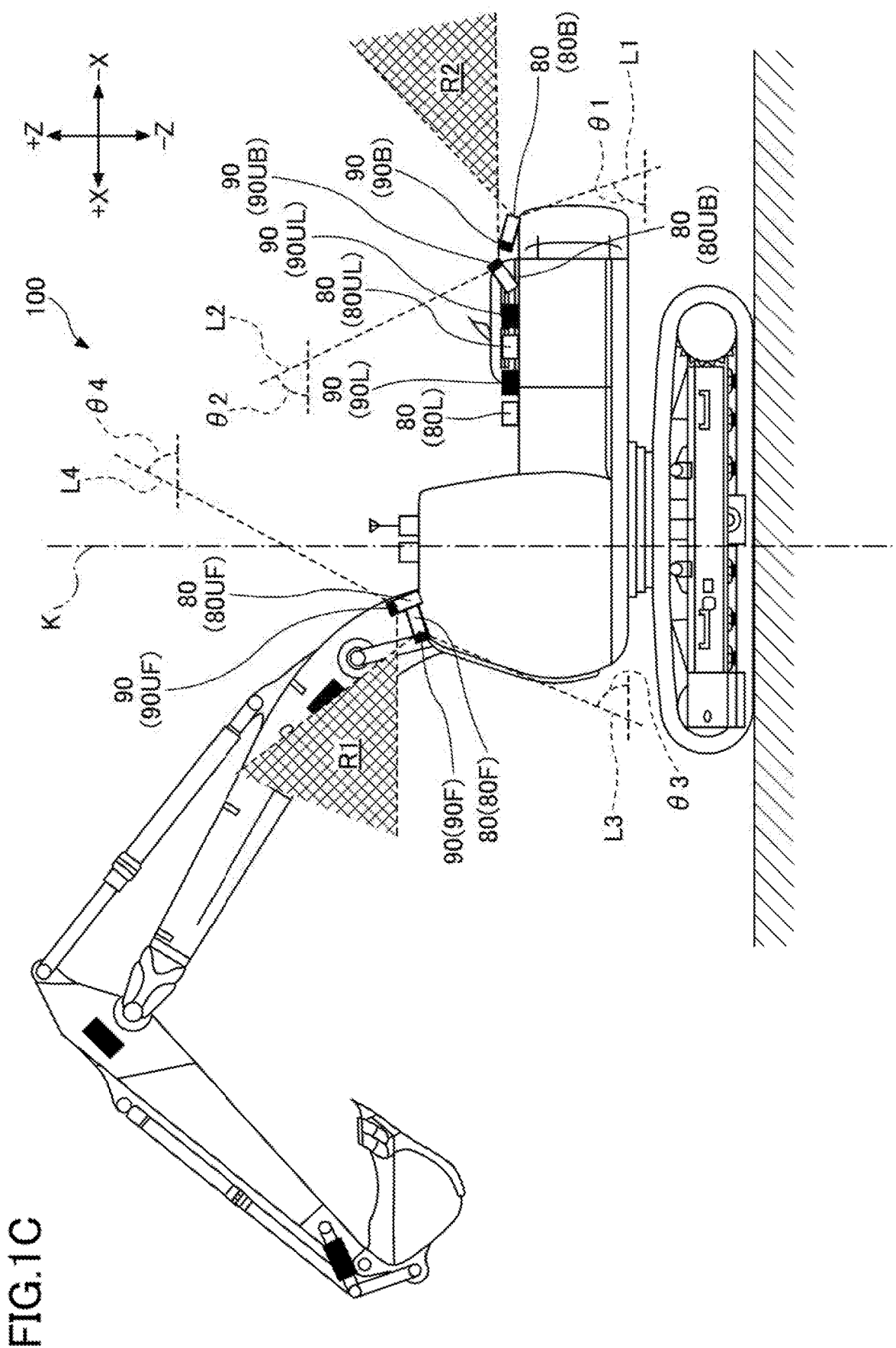
FIG. 1C is a side view of the example of the shovel according to the embodiment of the present invention.

As illustrated in FIG. 10, the rear camera 80B is configured such that a dashed line L1, which is a virtual line representing the lower boundary of the imaging range of the rear camera 80B, forms an angle (angle of depression) el with respect to the virtual plane (the virtual horizontal plane in the example of FIG. 1C) that is perpendicular to the turning axis K. The upper rear camera 80UB is configured such that a dashed line L2, which is a virtual line representing the upper boundary of the imaging range of the upper rear camera 80UB, forms an angle (angle of elevation) θ2 with respect to the virtual plane that is perpendicular to the turning axis K. The front camera 80F is configured such that a dashed line L3, which is a virtual line representing the lower boundary of the imaging range of the front camera 80F, forms an angle (angle of depression) θ3 with respect to the virtual plane that is perpendicular to the turning axis K. The upper front camera 80UF is configured such that a dashed line L4, which is a virtual line representing the upper boundary of the imaging range of the upper front camera 80UF, forms an angle (angle of elevation) θ4 with respect to the virtual plane that is perpendicular to the turning axis K. The angle (angle of depression) 01 and the angle (angle of depression) θ3 are preferably greater than or equal to 55°. In FIG. 1C, the angle (angle of depression) θ1 is approximately 70°, and the angle (angle of depression) θ3 is approximately 65°. The angle (angle of elevation) θ2 and the angle (angle of elevation) θ4 are preferably greater than or equal to 90°, more preferably greater than or equal to 135°, and even more preferably greater than or equal to 180°. In FIG. 1C, the angle (angle of elevation) θ2 is approximately 115°, and the angle (angle of elevation) θ4 is approximately 115°. Although not illustrated, the left camera 80L and the right camera 80R are configured such that the lower boundary of the imaging range of each of the left camera 80L and the right camera 80R forms an angle of depression of 55° or more with respect to the virtual plane that is perpendicular to the turning axis K. Similarly, the upper left camera 80UL and the upper right camera 80UR are configured such that the upper boundary of the imaging range of each of the upper left camera 80UL and the upper right camera 80UR forms an angle of elevation of 90° or more with respect to the virtual plane that is perpendicular to the turning axis K.

Accordingly, with the upper front camera 80UF, the shovel 100 can detect an object present in a space above the cabin 10. Further, with the upper rear camera 80UB, the shovel 100 can detect an object present in a space above an engine hood. Further, with the upper left camera 80UL or the upper right camera 80UR, the shovel 100 can detect an object present in a space above the upper turning body 3. In this manner, with the upper rear camera 80UB, the upper front camera 80UF, the upper left camera 80UL, or the upper right camera 80UR, the shovel 100 can detect an object present in a space above the shovel 100.

In FIG. 1D, an area R3 represents a range in which the imaging range of the front camera 80F overlaps the imaging range of the left camera 80L. An area R4 represents a range in which the imaging range of the left camera 80L overlaps the imaging range of the rear camera 80B. An area R5 represents a range in which the imaging range of the rear camera 80B overlaps the imaging range of the right camera 80R. An area R6 represents a range in which the imaging range of the right camera 80R overlaps the imaging range of the front camera 80F. That is, the front camera 80F and the left camera 80L are arranged such that the imaging ranges of the front camera 80F and the left camera 80L partially overlap in the horizontal direction. The left camera 80L and the rear camera 80B are arranged such that the imaging ranges of the left camera 80L and the rear camera 80B partially overlap in the horizontal direction. The rear camera 80B and the right camera 80R are arranged such that the imaging ranges of the rear camera 80B and the right camera 80R partially overlap in the horizontal direction. The right camera 80R and the front camera 80F are arranged such that the imaging ranges of the right camera 80R and the front camera 80F partially overlap in the horizontal direction. Further, although not illustrated, the upper front camera 80UF and the upper left camera 80UL are arranged such that the imaging ranges of the upper front camera 80UF and the upper left camera 80UL partially overlap in the horizontal direction. In addition, the upper left camera 80UL and the upper rear camera 80UB are arranged such that the imaging ranges of the upper left camera 80UL and the upper rear camera 80UB partially overlap in the horizontal direction. In addition, the upper rear camera 80UB and the upper right camera 80UR are arranged such that the imaging ranges of the upper rear camera 80UB and the upper right camera 80UR partially overlap in the horizontal direction. In addition, the upper right camera 80UR and the upper front camera 80UF are arranged such that the imaging ranges of the upper right camera 80UR and the upper front camera 80UF partially overlap in the horizontal direction.

With the above-described arrangements, the upper front camera 80UF can capture an image of an object present in a space where the end of the boom 4 is located and in the vicinity of the end of the boom 4 when the boom 4 is raised most. Accordingly, the controller 30 can use the image captured by the upper front camera 80UF to prevent the end of the boom 4 from contacting an overhead power line installed above the shovel 100.

The upper front camera 80UF may be attached to the cabin 10, such that the arm 5 and bucket 6 are within the imaging range of the upper front camera 80UF even when at least one of the arm 5 and bucket 6 is rotated while the boom 4 is raised most. In this case, even when at least one of the arm 5 and the bucket 6 is opened to the maximum while the boom 4 is raised most, the controller 30 can determine whether there is a possibility that a surrounding object may contact the excavation attachment AT.

A GPS device (GNSS receiver) P1, a transmitter T1, and an obstacle detector 90 are mounted to the top of the cabin 10.

The GPS device P1 uses a GPS function to detect the position of the shovel 100, and transmits position information to the machine guidance device 50 included in the controller 30.

The transmitter T1 is a transmitter that transmits information to the outside of the shovel 100.

The obstacle detector 90 is another example of a surroundings monitoring device, and detects obstacles in the vicinity of the shovel 100, such as power lines, utility poles, people, animals, vehicles (such as dump trucks), work equipment, construction machines, buildings, and electrical wires. In addition, the obstacle detector 90 may determine the presence of people from helmets, safety vests, working clothes, predetermined marks attached to helmets, or the like. For example, the obstacle detector 90 may be a camera such as a monocular camera or a stereo camera, or an ultrasonic sensor, a milliwave radar, a laser radar (light detection and ranging (LIDAR)), a distance image sensor, or an infrared sensor, and transmits a detected signal to the controller 30. Further, the obstacle detector 90 is configured to calculate the distance from the obstacle detector 90 or the shovel 100 to a detected object. Further, the obstacle detector 90, serving as the surroundings monitoring device, may be configured to detect a predetermined object within a predetermined region set in the vicinity of the shovel 100. That is, the obstacle detector 90 may be configured to identify at least one of the type, the position, and the shape of an object. For example, the obstacle detector 90 may be configured to distinguish between a person and an object other than a person. Further, the obstacle detector 90 may be configured to calculate the distance from the obstacle detector 90 or the shovel 100 to a detected object.

The shovel 100 is not required to include both the image capturing device 80 and the obstacle detector 90. As long as the positional relationship between a surrounding object and the shovel 100 can be identified, the shovel 100 may include the obstacle detector 90 only. Alternatively, as long as the positional relationship between a surrounding object and the shovel 100 can be identified, the shovel 100 may include the image capturing device 80 only.

In the present embodiment, the obstacle detector 90 includes a rear sensor 90B and an upper rear sensor 90UB, which are LIDARs attached to the rear end of the upper surface of the upper turning body 3, a front sensor 90F and an upper front sensor 90UF, which are LIDARs attached to the front end of the upper surface of the cabin 10, a left sensor 90L and an upper left sensor 90UL, which are LIDARs attached to the left end of the upper surface of the upper turning body 3, and a right sensor 90R and an upper right sensor 90UR, which are LIDARs attached to the right end of the upper surface of the upper turning body 3.

The rear sensor 90B is configured to detect an object located behind and obliquely below the shovel 100. The upper rear sensor 90UB is configured to detect an object located behind and obliquely above the shovel 100. The front sensor 90F is configured to detect an object located in front of and obliquely below the shovel 100. The upper front sensor 90UF is configured to detect an object located to the left and obliquely above the shovel 100. The left sensor 90L is configured to detect an object located to the left and obliquely below the shovel 100. The upper left sensor 90UL is configured to detect an object located to the left and obliquely above the shovel 100. The right sensor 90R is configured to detect an object located to the right and obliquely below the shovel 100. The upper right sensor 90UR is configured to detect an object located to the right and obliquely above the shovel 100.

The obstacle detector 90 may be arranged in a similar manner to the image capturing device 80. That is, the rear sensor 90B and the upper rear sensor 90UB may be arranged such that monitoring ranges (detection ranges) of the rear sensor 90B and the upper rear sensor 90UB partially overlap in the vertical direction. Further, the front sensor 90F and the upper front sensor 90UF may be arranged such that detection ranges of the front sensor 90F and the upper front sensor 90UF partially overlap in the vertical direction. Further, the left sensor 90L and the upper left sensor 90UL may be arranged such that detection ranges of the left sensor 90L and the upper left sensor 90UL partially overlap in the vertical direction. Further, the right sensor 90R and the upper right sensor 90UR may be arranged such that the right sensor 90R and the upper right sensor 90UR partially overlap in the vertical direction. In addition, the front sensor 90F and the left sensor 90L may be arranged such that the front sensor 90F and the left sensor 90L partially overlap in the horizontal direction. Further, the left sensor 90L and the rear sensor 90B may be arranged such that the left sensor 90L and the rear sensor 90B partially overlap in the horizontal direction. Further, the rear sensor 90B and the right sensor 90R may be arranged such that detection ranges of the rear sensor 90B and the right sensor 90R may partially overlap in the horizontal direction. Further, the right sensor 90R and the front sensor 90F may be arranged such that the right sensor 90R and the front sensor 90F partially overlap in the horizontal direction. Further, the upper front sensor 90UF and the upper left sensor 90UL may be arranged such that the upper front sensor 90UF and the upper left sensor 90UL partially overlap in the horizontal direction. Further, the upper left sensor 90UL and the upper rear sensor 90UB may be arranged such that the upper left sensor 90UL and the upper rear sensor 90UB partially overlap in the horizontal direction. Further, the upper rear sensor 90UB and the upper right sensor 90UR may be arranged such that the upper rear sensor 90UB and the upper right sensor 90UR partially overlap in the horizontal direction. Further, the upper right sensor 90UR and the upper front sensor 90UF may be arranged such that the upper right sensor 90UR and the upper front sensor 90UF partially overlap in the horizontal direction.

The rear sensor 90B, the front sensor 90F, the left sensor 90L, and the right sensor 90R may be configured such that the optical axis of each of the rear sensor 90B, the front sensor 90F, the left sensor 90L, and the right sensor 90R forms an angle of depression with respect to the virtual plane that is perpendicular to the turning axis K. The upper rear sensor 90UB, the upper front sensor 90UF, the upper left sensor 90UL, and the upper right sensor 90UR may be configured such that the optical axis of each of the upper rear sensor 90UB, the upper front sensor 90UF, the upper left sensor 90UL, and the upper right sensor 90UR forms an angle of elevation with respect to the virtual plane that is perpendicular to the turning axis K.

The rear sensor 90B, the front sensor 90F, the left sensor 90L, and the right sensor 90R may be configured such that the lower boundary of the detection range of each of the rear sensor 90B, the front sensor 90F, the left sensor 90L, and the right sensor 90R may form an angle of depression with respect to the virtual plane that is perpendicular to the turning axis K. The upper rear sensor 90UB, the upper front sensor 90UF, the upper left sensor 90UL, and the upper right sensor 90UR may be configured such that the upper boundary of the detection range of each of the upper rear sensor 90UB, the upper front sensor 90UF, the upper left sensor 90UL, and the upper right sensor 90UR forms an angle of elevation with respect to the virtual plane that is perpendicular to the turning axis K.

In the present embodiment, the rear camera 80B is placed next to the rear sensor 90B. The front camera 80F is placed next to the front sensor 90F. The left camera 80L is placed next to the left sensor 90L. The right camera 80R is placed next to the right sensor 90R. Further, the upper rear camera 80UB is placed next to the upper rear sensor 90UB. The upper front camera 80UF is placed next to the upper front sensor 90UF. The upper left camera 80UL is placed next to the upper left sensor 90UL. The upper right camera 80UR is placed next to the upper right sensor 90UR.

In the present embodiment, the image capturing device 80 and the obstacle detector 90 are attached to the upper turning body 3 so as not to project outward from the outline of the upper turning body 3 when viewed from the top as illustrated in FIG. 1D. However, one of the image capturing device 80 and the obstacle detector 90 may be attached to the upper turning body 3 so as to project outward from the outline of the upper turning body 3 when viewed from the top.

The upper rear camera 80UB is not required to be provided, or may be integrated with the rear camera 80B. The rear camera 80B, with which the upper rear camera 80UB is integrated, may be configured to cover a larger imaging range to include the imaging range of the upper rear camera 80UB. The same applies to the upper front camera 80UF, the upper left camera 80UL, and the upper right camera 80UR. Further, the upper rear sensor 90UB is not required to be provided, or may be integrated with the rear sensor 90B. The same applies to the upper front sensor 90UF, the upper left sensor 90UL, and the upper right sensor 90UR. Further, at least two of the upper rear camera 80UB, the upper front camera 80UF, the upper left camera 80UL, and the upper right camera 80UR may be integrated into one or more omnidirectional cameras or hemispherical cameras.

Figure 2:
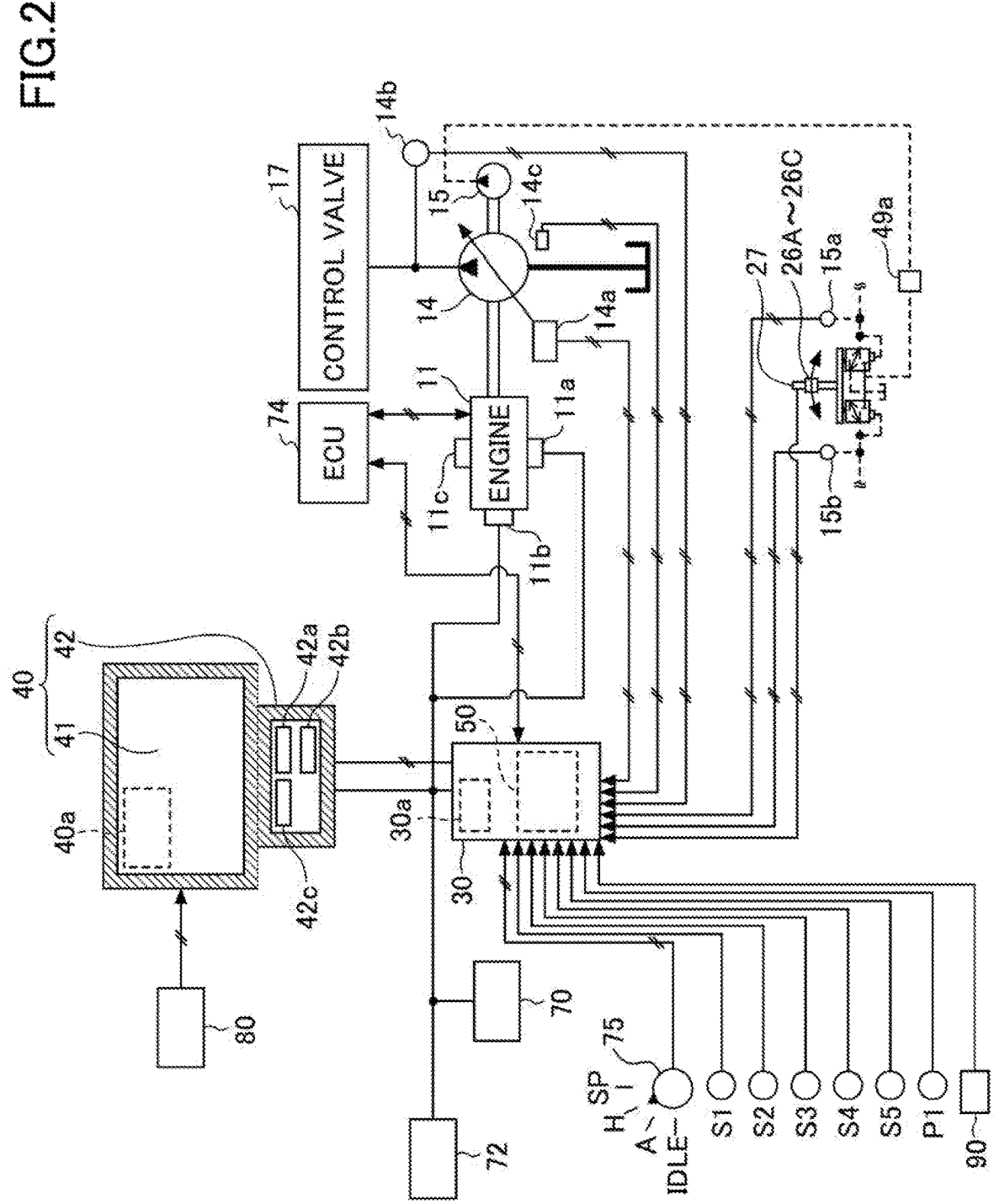
FIG. 2 is a diagram illustrating an example configuration of a drive control system of the shovel of FIG. 1A.

Next, an example configuration of a drive control system of the shovel 100 will be described with reference to FIG. 2. FIG. 2 is a diagram illustrating the example configuration of the drive control system of the shovel 100.

The display device 40 is provided in the cabin 10, and displays an image including work information transmitted from the machine guidance device 50. For example, the display device 40 may be connected to the controller 30 including the machine guidance device 50 via a communication network, such as a controller area network (CAN) or a local interconnect network (LIN), or via a dedicated line.

The display device 40 includes a conversion processing unit 40a that generates an image to be displayed on an image display unit 41. For example, the conversion processing unit 40a generates an image to be displayed on the image display unit 41, based on image data obtained from the image capturing device 80. The image data obtained from the image capturing device 80 includes image data obtained from each of the left camera 80L, the right camera 80R, and the rear camera 80B.

Further, among various types of data input into the display device 40 from the controller 30, the conversion processing unit 40a converts data, to be displayed on the display device 40, into image signals. The various types of data input into the display device 40 from the controller 30 include data indicating the temperature of engine coolant water, data indicating the temperature of hydraulic oil, data indicating the remaining amount of an aqueous urea solution, and data indicating the remaining amount of fuel.

The conversion processing unit 40a outputs the converted image signals to the image display unit 41, and causes images, generated based on captured images and various types of data, to be displayed on the image display unit 41.

The conversion processing unit 40a may be provided in, for example, the controller 30 instead of the display device 40. In this case, the image capturing device 80 is connected to the controller 30.

The display device 40 includes a switch panel 42, which serves as an input device. The switch panel 42 is a panel including various hardware switches. The switch panel 42 includes a light switch 42a, a windshield wiper switch 42b, and a windshield washer switch 42c.

The light switch 42a is a switch for turning on and off lights attached to the exterior of the cabin 10. The windshield wiper switch 42b is a switch for moving and stopping a windshield wiper. The windshield washer switch 42c is a switch for spraying windshield washer fluid.

The display device 40 is supplied with electric power from a rechargeable battery 70 for operation. The rechargeable battery 70 is charged with electric power generated in an alternator 11a (generator) of the engine 11. The electric power of the rechargeable battery 70 is supplied to electrical equipment 72 or the like of the shovel 100, in addition to the controller 30 and the display device 40. A starter 11b of the engine 11 is driven with electric power from the rechargeable battery 70 to start the engine 11.

The engine 11 is connected to a main pump 14 and a pilot pump 15, and is controlled by an engine control unit (ECU) 74. The ECU 74 constantly transmits various data indicating the conditions of the engine 11 to the controller 30. Examples of the various data include data indicating the temperature of coolant water (physical quantity) detected by a water temperature sensor 11c. The controller 30 stores various data in an internal memory 30a and transmits the data to the display device 40 as necessary.

The main pump 14 is a hydraulic pump for supplying hydraulic oil to a control valve 17 via a high-pressure hydraulic line. For example, the main pump 14 may be a swash-plate variable displacement hydraulic pump.

The pilot pump 15 is a hydraulic pump for supplying hydraulic oil to various hydraulic control devices via a pilot line. For example, the pilot pump 15 may be a fixed displacement hydraulic pump. Note that the pilot pump 15 is not necessarily provided. In this case, the function of the pilot pump 15 may be implemented by the main pump 14. That is, the main pump 14 may include the function of supplying hydraulic oil to the operation device 26 (such as operating levers 26A to 26C) after reducing the pressure of the hydraulic oil with a throttle or the like, separately from the function of supplying hydraulic oil to the control valve 17.

The control valve 17 is a hydraulic control device that controls the hydraulic system in the shovel 100. The control valve 17 selectively supplies hydraulic oil, discharged from the main pump 14, to the boom cylinder 7, the arm cylinder 8, the bucket cylinder 9, the traveling hydraulic motor, and the turning hydraulic motor, for example. Note that the boom cylinder 7, the arm cylinder 8, the bucket cylinder 9, the traveling hydraulic motor, and the turning hydraulic motor may be hereinafter referred to as "hydraulic actuator".

The operating levers 26A to 26C are provided in the cabin 10, and are used by the operator to operate the hydraulic actuators. When the operating levers 26A to 26C are operated, hydraulic oil is supplied from the pilot pump to pilot ports of flow control valves corresponding to the respective hydraulic actuators. The hydraulic oil is supplied to a corresponding pilot port at a pressure in accordance with the direction of operation and the amount of operation of each of the operating levers 26A to 26C.

In the present embodiment, the operating lever 26A is a boom operating lever. When the operator operates the operating lever 26A, the boom cylinder 7 is hydraulically driven to operate the boom 4. The operating lever 26B is an arm operating lever. When the operator operates the operating lever 26B, the arm cylinder 8 is hydraulically driven to operate the arm 5. The operating lever 26C is a bucket operating lever. When the operator operates the operating lever 26C, the bucket cylinder 9 is hydraulically driven to operate the bucket 6. In addition to the operating levers 26A to 26C, the shovel 100 may include operating levers and operating pedals for driving traveling hydraulic motors and turning hydraulic motors.

The controller 30 acquires various types of data as will be described later. The data acquired by the controller 30 is stored in the memory 30a.

A regulator 14a of the main pump 14, which is a variable displacement hydraulic pump, transmits data indicating a swash plate angle to the controller 30. Further, a discharge pressure sensor 14b transmits data indicating the discharge pressure of the main pump 14 to the controller 30. The above-described data (data indicating physical quantities) is stored in the memory 30a. Further, an oil temperature sensor 14c, provided in a conduit between the main pump 14 and a tank storing hydraulic oil to be drawn in by the main pump 14, transmits data indicating the temperature of hydraulic oil flowing through the conduit to the controller 30.

Pressure sensors 15a and 15b detect pilot pressures generated when the operating levers 26A to 26 are operated, and transmit data indicating the detected pilot pressures to the controller 30. The operating levers 26A to 26C are provided with a switch button 27. For example, the operator can transmit a command signal to the controller 30 by operating the switch button 27 while operating the operating levers 26A to 26C.

An engine rotational speed adjustment dial 75 is provided in the cabin 10 of the shovel 100. The engine rotational speed adjustment dial 75 is a dial for adjusting the engine rotational speed. For example, the engine rotational speed can be switched in a stepwise manner by operating the engine rotational speed adjustment dial 75. In the present embodiment, the engine rotational speed adjustment dial 75 enables the operator to switch the engine rotational speed among the four levels of SP mode, H mode, A mode, and IDLE mode. The engine rotational speed adjustment dial 75 transmits data indicating the setting of the engine rotational speed to the controller 30. FIG. 2 illustrates a state in which the H mode is selected by the engine rotational speed adjustment dial 75.

The SP mode is a rotational speed mode selected when it is desired to prioritize workload, and uses the highest engine rotational speed. The H mode is a rotational speed mode selected when it is desired to satisfy both workload and fuel efficiency, and uses the second highest engine rotational speed. The A mode is a rotational speed mode selected when it is desired to operate the shovel 100 with low noise while prioritizing fuel efficiency, and uses the third highest engine rotational speed. The IDLE mode is a rotational speed mode selected when it is desired to idle the engine, and uses the lowest engine rotational speed. The engine 11 is controlled to operate constantly at an engine rotational speed corresponding to a rotational speed mode set by the engine rotational speed adjustment dial 75.

The obstacle detector 90 transmits data of obstacles located in the vicinity of the shovel 100, such as power lines and utility poles, to the controller 30. The data of the obstacles includes the sizes of the obstacles and position information of the obstacles.

Although a hydraulic operating lever including a hydraulic pilot circuit has been described above as a type of the operating lever 26A, an electrical operating lever including an electrical pilot circuit may be employed instead of the hydraulic operating lever. In this case, the amount of lever operation of the electrical operating lever is input into the controller 30 as an electrical signal. Further, a solenoid valve is placed between the pilot pump 15 and a pilot port of each control valve. The solenoid valve is configured to operate in response to an electrical signal from the controller 30. With the above configuration, when a manual operation using the electrical operating lever is performed, the controller 30 can move each of the control valves by controlling the solenoid valve using an electrical signal corresponding to the amount of lever operation so as to increase or decrease a pilot pressure. Note that each of the control valves may be constituted of a solenoid spool valve. In this case, the solenoid spool valve operates in response to an electrical signal from the controller 30 corresponding to the amount of lever operation of the electrical operating lever.

Figure 3:
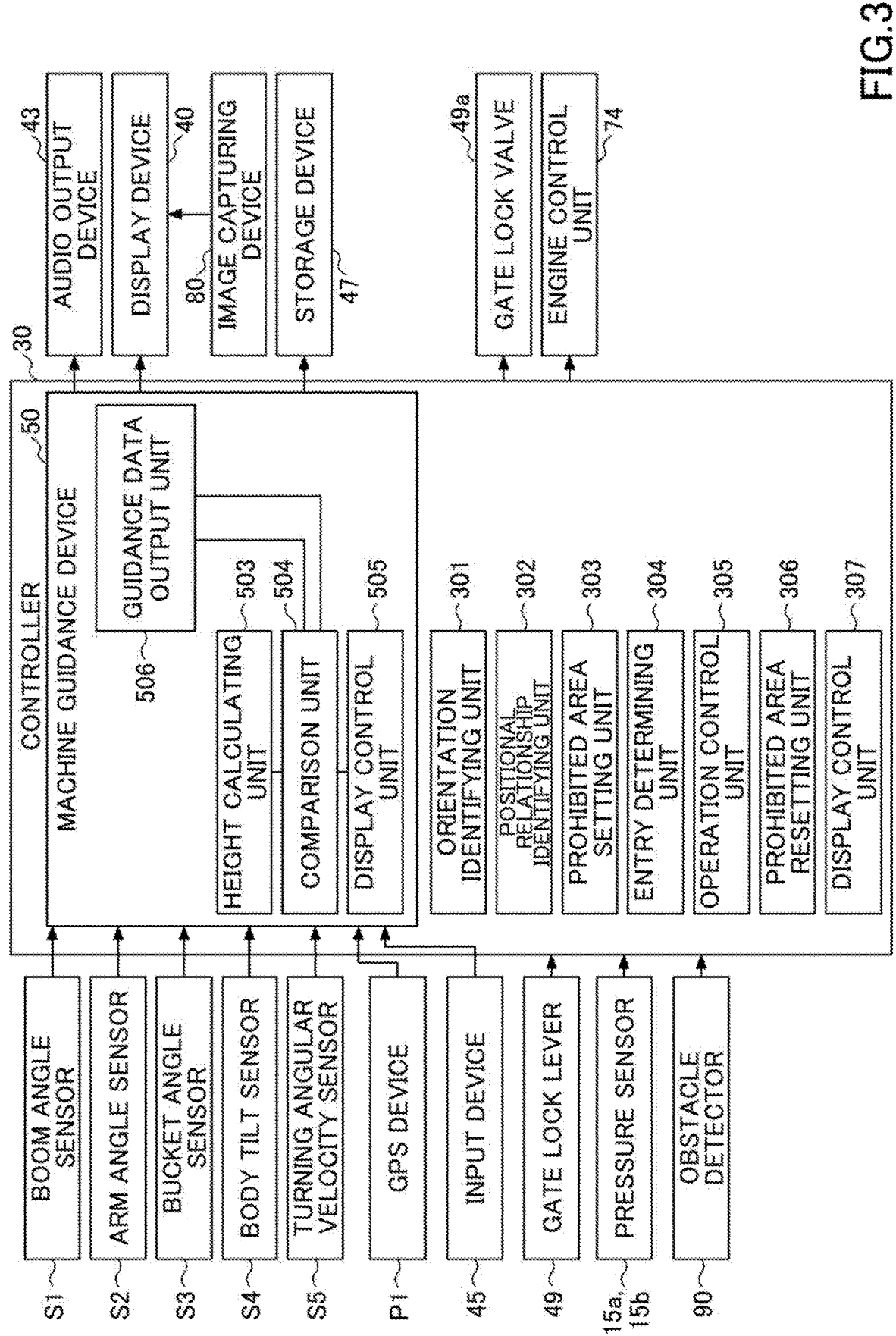
FIG. 3 is a block diagram illustrating an example configuration of a controller and a machine guidance device.

Next, various functions of the controller 30 and the machine guidance device 50 of the shovel 100 will be described with reference to FIG. 3. FIG. 3 is a block diagram illustrating an example configuration of the controller 30 and the machine guidance device 50.

The controller 30 controls the operation of the entirety of the shovel 100 including the ECU 74. the controller 30 closes a gate lock valve 49a when the gate lock lever 49 is pushed down, and opens the gate lock valve 49a when the gate lock lever 49 is pulled up. The gate lock valve 49a is a selector valve provided in an oil conduit between the control valve 17 and the operating levers 26A to 26C (see FIG. 2). The gate lock valve 49a is configured to open or close in response to a command from the controller 30. Alternatively, the gate lock valve 49a may be mechanically connected to the gate lock lever 49 to open or close in response to the operation of the gate lock lever 49.

The gate lock valve 49a is closed to shut off the flow of hydraulic oil between the control valve 17 and the operating levers 26A to 26C to disable the operating levers 26A to 26C. The gate lock valve 49a is open to flow hydraulic oil between the control valve 17 and the operating levers 26A to 26C to enable the operating levers 26A to 26C.

With the gate lock valve 49a being open to enable the operating levers 26A to 26C, the controller 30 detects the amount of operation of each of the operating levers 26A to 26C from pilot pressures detected by the pressure sensors 15a and 15b.

In addition to controlling the operation of the entirety of the shovel 100, the controller 30 controls whether to provide guidance of the machine guidance device 50. Specifically, in response to determining that the shovel 100 is not working, the controller 30 transmits a guidance stop command to the machine guidance device 50 to stop guidance.

The controller 30 may output a guidance stop command to the machine guidance device 50 when outputting an automatic idling stop command to the ECU 74. Alternatively, the controller 30 may output a guidance stop command to the machine guidance device 50 in response to determining that the gate lock lever 49 is pushed down.

The controller 30 includes an orientation identifying unit 301, a positional relationship identifying unit 302, a prohibited area setting unit 303, an entry determining unit 304, an operation control unit 305, a prohibited area resetting unit 306, and a display control unit 307.

The orientation identifying unit 301 identifies the position and orientation of the shovel 100. In the present embodiment, the orientation identifying unit 301 identifies the position of the shovel 100, based on position information of the shovel 100 detected by the GPS device P1. Further, the orientation identifying unit 301 identifies the orientation of the shovel 100, based on the rotation angle of the boom 4 detected by the boom angle sensor S1, the rotation angle of the arm 5 detected by the arm angle sensor S2, and the rotation angle of the bucket 6 detected by the bucket angle sensor S3. Note that the orientation identifying unit 301 may identify the orientation of the shovel 100 by using the body inclination sensor S4. Further, the orientation identifying unit 301 may identify the relative position between the lower traveling body 1 and the upper turning body 3 by using an orientation detector. For example, the orientation detector may be configured by a combination of a direction sensor attached to the lower traveling body 1 and a direction sensor attached to the upper turning body 3, or may be configured by the turning angular velocity sensor S5. The turning angular velocity sensor S5 may be attached to, for example, a center joint provided in relation to the mechanism that achieves relative rotation between the lower traveling body 1 and the upper turning body 3. Further, in a configuration in which the upper turning body 3 is driven to turn by a turning motor generator, the orientation detector 71 may be configured by a resolver.

The positional relationship identifying unit 302 identifies the positional relationship between an obstacle located in a work area and the shovel 100. In the present embodiment, the positional relationship identifying unit 302 identifies the positional relationship between an obstacle and the shovel 100 based on position information of the obstacle detected by the obstacle detector 90 and position information of the shovel 100 identified by the orientation identifying unit 301. Further, the positional relationship between the obstacle and the shovel 100, identified by the positional relationship identifying unit 302, may be transmitted to a device outside the shovel 100 (for example, to a management apparatus capable of communicating with the shovel 100 via a network) via the transmitter T1.

The prohibited area setting unit 303 sets a prohibited area based on the positional relationship between an obstacle and the shovel 100 identified by the positional relationship identifying unit 302. For example, a prohibited area may be set as a predetermined range in which an obstacle is included. Further, prohibited areas may be set for individual obstacles, and the prohibited areas may be set as predetermined ranges from the outlines of the respective obstacles. That is, a prohibited area may be set as a range of a preset distance from an obstacle. Further, a predetermined range set as a prohibited area may vary in accordance with the type of an obstacle. Further, a prohibited area may be set for a space between each obstacle and the shovel. In this manner, a prohibited area is set for an obstacle located on the ground surface of a work area.

The entry determining unit 304 determines whether the shovel 100 has entered a prohibited area set by the prohibited area setting unit 303, based on the positional relationship between an obstacle and the shovel 100 identified by the positional relationship identifying unit 302.

If the entry determining unit 304 determines that the shovel 100 has entered a prohibited area, the operation control unit 305 slows or stops the movement of the shovel 100.

Further, if the entry determining unit 304 determines that the shovel 100 has entered a prohibited area, the operation control unit 305 may alarm the operator through the audio output device 43.

The prohibited area resetting unit 306 resets a prohibited area. For example, when a prohibited area to be reset is selected through the input device 45, the prohibited area resetting unit 306 resets the selected prohibited area. In addition, when an obstacle is no longer located in a prohibited area, the prohibited area may be displayed by a dashed line or a different color such that the prohibited area can be distinguished from other prohibited areas. In this case, when the prohibited area where the obstacle is no longer located is selected through the input device 45, the prohibited area resetting unit 306 may reset the prohibited area where the obstacle is no longer located.

The display control unit 307 controls an image to be displayed on the image display unit 41 of the display device 40. In the present embodiment, for example, the display control unit 307 superimposes a prohibited area set by the prohibited area setting unit 303 on an arrangement drawing, and displays the prohibited area, superimposed on the arrangement drawing, on the image display unit 41 of the display device 40. Further, the display control unit 307 may cause the image display unit 41 of the display device 40 to simultaneously display arrangement drawings before and after the prohibited area is superimposed. An arrangement drawing may include information on a fixed ruler and two-dimensional or three-dimensional construction drawing data.

Next, the machine guidance device 50 will be described. The machine guidance device 50 receives various signals and data, which are transmitted from the boom angle sensor S1, the arm angle sensor S2, the bucket angle sensor S3, the body inclination sensor S4, the GPS device P1, the input device 45 to the controller 30.

The machine guidance device 50 calculates the actual movement position of the attachment such as the bucket 6 based on the received signals and data. Then, the machine guidance device 50 compares the actual movement position of the attachment such as the bucket 6 with a target construction surface, and calculates the distance between the attachment, such as the bucket 6, and the target construction surface. In addition, the machine guidance device 50 calculates the distance between the turning axis of the shovel 100 and the tip of the bucket 6, the inclination angle of the target construction surface, and the like, and transmits the calculated distance, the inclination angle, and the like to the display device 40 as work information.

If the machine guidance device 50 and the controller 30 are separately provided, the machine guidance device 50 and the controller 30 communicate with each other via a CAN.

The machine guidance device 50 includes a height calculating unit 503, a comparison unit 504, a display control unit 505, and a guidance data output unit 506.

The height calculating unit 503 calculates the height of the end (tip) of the bucket 6 based on the angles of the boom 4, the arm 5, and the bucket 6, obtained from detection signals of the boom angle sensor S1, the arm angle sensor S2, and the bucket angle sensor S3.

The comparison unit 504 compares the height of the end (tip) of the bucket 6, which is calculated by the height calculating unit 503, to the position of a target construction surface indicated in guidance data, which is output from the guidance data output unit 506. Further, the comparison unit 504 acquires the inclination angle of the target construction surface relative to the shovel 100. The various data acquired by the height calculating unit 503 and the comparison unit 504 is stored in the storage device 47.

The display control unit 505 transmits the height of the bucket 6, the inclination angle of the target construction surface, and the like, acquired by the comparison unit 504, to the display device 40 as work information. The display device 40 displays, on a display screen, the work information transmitted from the display control unit 505 together with a captured image transmitted from the image capturing device 80. The configuration of the display screen of the display device 40 will be described later. Further, the display control unit 505 can alarm the operator via the audio output device 43 if the bucket 6 is positioned lower than the target construction surface.

Figure 4:
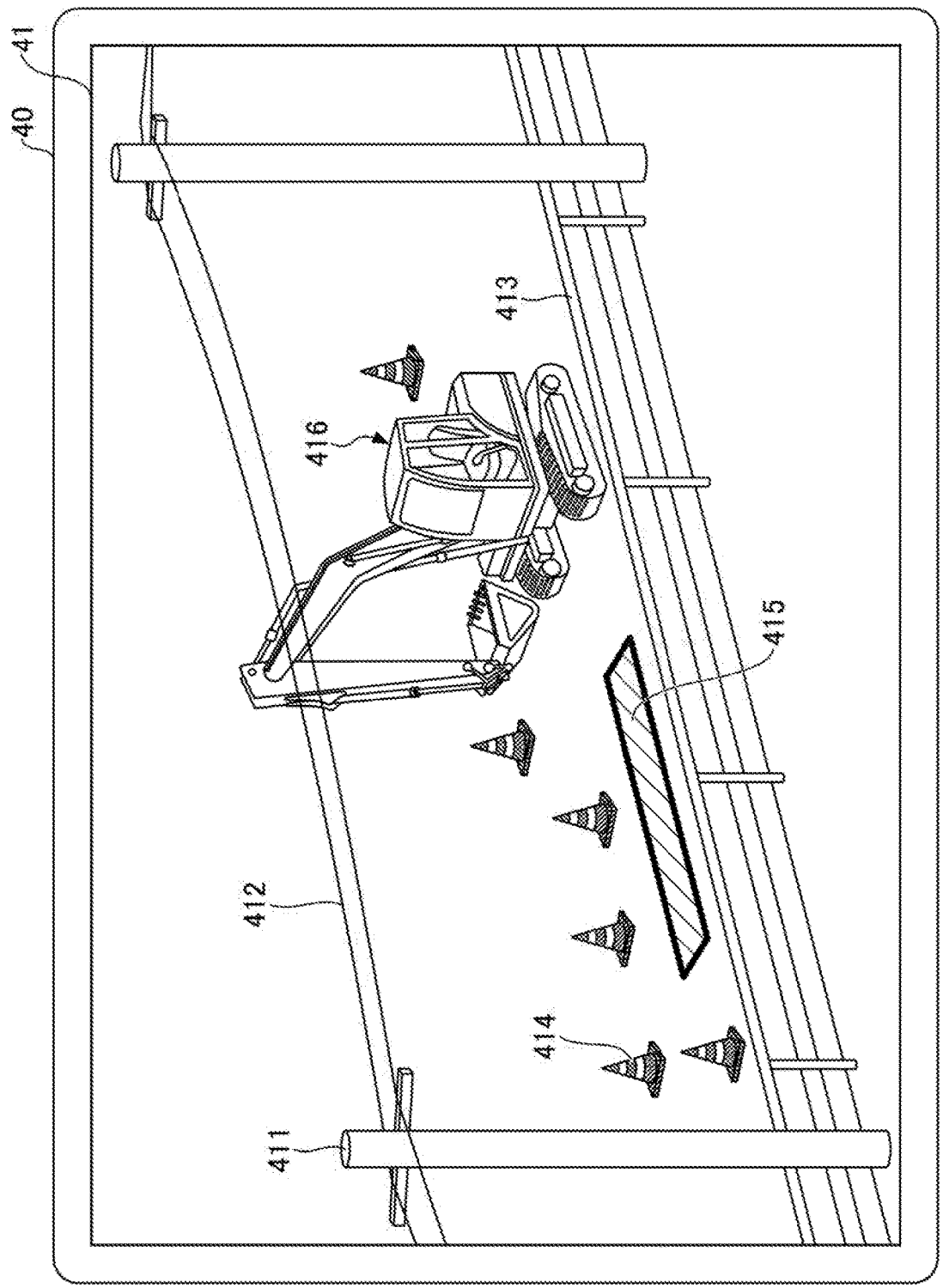
FIG. 4 is a diagram illustrating an example image of an arrangement drawing before prohibited areas are set for the shovel on the road.
Figure 5:
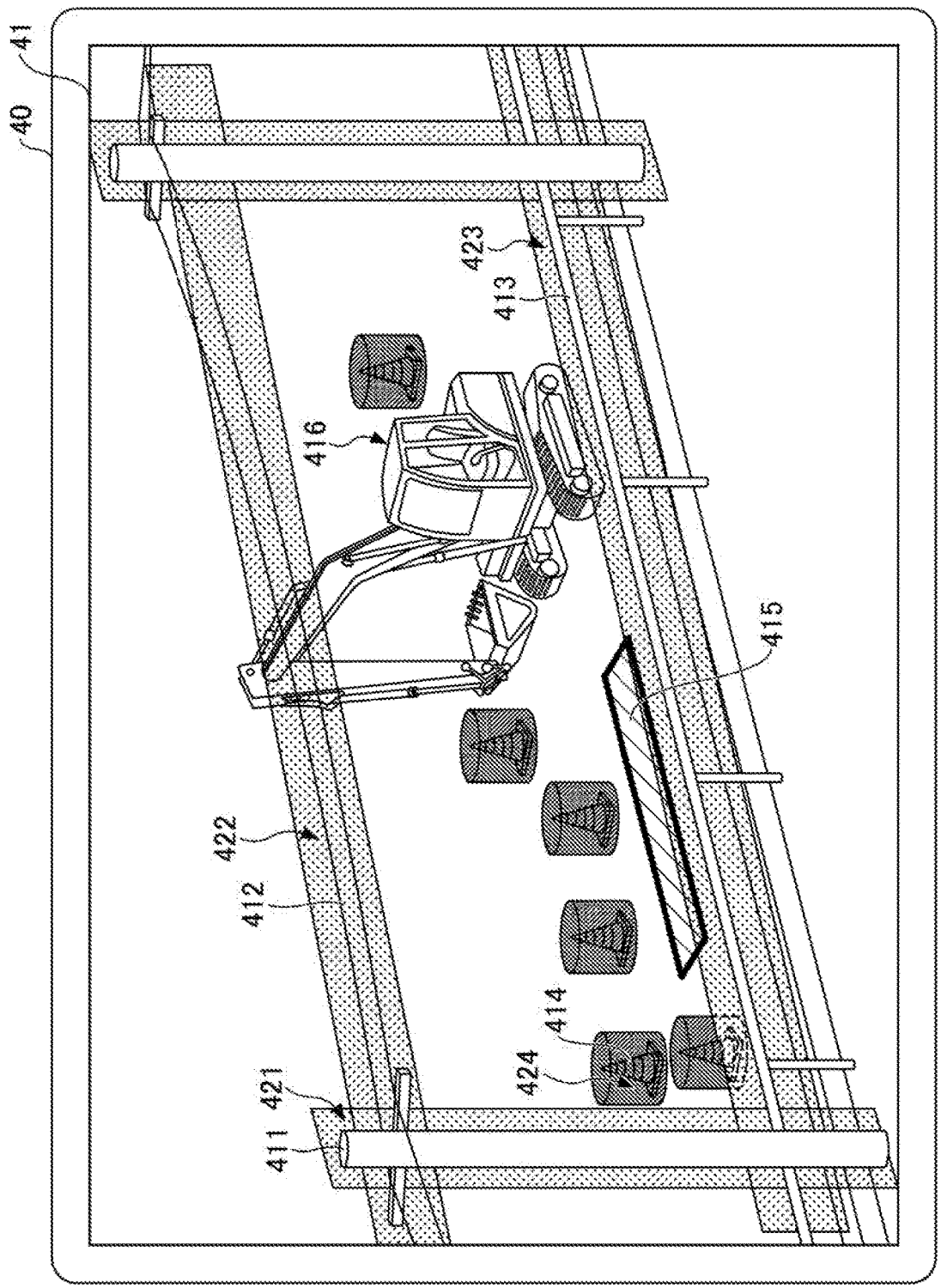
FIG. 5 is a diagram illustrating an example image of the arrangement drawing after the prohibited areas are set.

Next, referring to FIG. 4 and FIG. 5, example images displayed on the image display unit 41 of the display device 40 will be described. FIG. 4 is a diagram illustrating an example image of an arrangement drawing before prohibited areas are set for the shovel 100 on the road. FIG. 5 is a diagram illustrating an example image of the arrangement drawing after the prohibited areas are set.

As illustrated in FIG. 4, the image display unit 41 displays an arrangement drawing in which the viewpoint is changed from the shovel to a work target. The arrangement drawing can be generated from any viewpoint within a captured range. The arrangement drawing illustrated in FIG. 4 is a viewpoint change image indicating the arrangement relationship viewed from the outside of a road boundary fence (from a sidewalk). The arrangement relationship between the shovel and the vicinity of the shovel can be visually identified. The arrangement drawing includes a utility pole image 411, a power line image 412, a road boundary fence image 413, a road cone image 414, a buried object image 415, and a shovel image 416. Further, as illustrated in FIG. 5, the image display unit 41 displays prohibited areas 421, 422, 423, and 424, which are set as respective predetermined ranges including the utility pole image 411, the power line image 412, road boundary fence image 413, and road cone image 414.

The utility pole image 411 is an image indicating the position of a utility pole, which is an example of an obstacle. The power line image 412 is an image indicating the position of power line, which is an example of an obstacle. The road boundary fence image 413 is an image indicating the position of a road boundary fence, which is an example of an obstacle. The road cone image 414 is an image indicating the position of a road cone, which is an example of an obstacle. The buried object image 415 is an image indicating the position of a buried object, which is an example of an obstacle.

The arrangement drawing is generated based on detection data of the obstacle detector 90. The arrangement drawing may be generated by combining detection data of the obstacle detector 90 with detection data of the image capturing device 80.

Further, the GPS device (GNSS receiver) P1 can obtain the arrangement position (arrangement coordinates) of the shovel 100 in a reference coordinate system used for a construction plan drawing. The reference coordinate system may be the World Geodetic System. The World Geodetic System is a three-dimensional orthogonal XYZ coordinate system in which the origin is at the center of gravity of the earth, the X-axis passes through the intersection of the Greenwich meridian and the equator, the Y-axis passes through 90 degrees east longitude, and the Z-axis passes through the north pole. Further, because the positional relationship between obstacles and the shovel 100 can be identified, the coordinates of each of the obstacles detected by the obstacle detector 90 can be calculated in the reference coordinate system. Therefore, the arrangement position of each of the obstacles can be input into the construction plan drawing. Accordingly, it is possible not only to set a target construction surface in the construction plan drawing, but also to calculate the arrangement positions of the obstacles with respect to the target construction surface, thus allowing the obstacles to be superimposed and displayed on the construction plan drawing.

A prohibited area may be superimposed and displayed on an arrangement drawing or a construction plan drawing displayed on the display device 40. For example, the prohibited area may be set by the operator pressing a setting button after checking an image of the prohibited area displayed on the display device 40. Alternatively, the prohibited area may be automatically set when the controller 30 identifies the prohibited area. Further, information related to obstacles such as utility poles and fences that can be identified beforehand may be preliminarily set as data related to a construction plan drawing. In this case, the controller 30 may preliminarily associate a position on a target construction surface with the position of each of the obstacles when the construction plan drawing is acquired. At the time of construction, the controller 30 can generate prohibited areas based on the positional relationship between the target construction surface and the obstacles. Further, the controller 30 can generate prohibited areas by associating the arrangement of road cones, whose positional relationship changes depending on the construction situation, with the arrangement of preliminarily set obstacles.

The shovel image 416 is an image indicating the position of the shovel 100. The position of the shovel 100 is identified based on position information of the shovel 100 detected by the GPS device P1.

Figure 6:
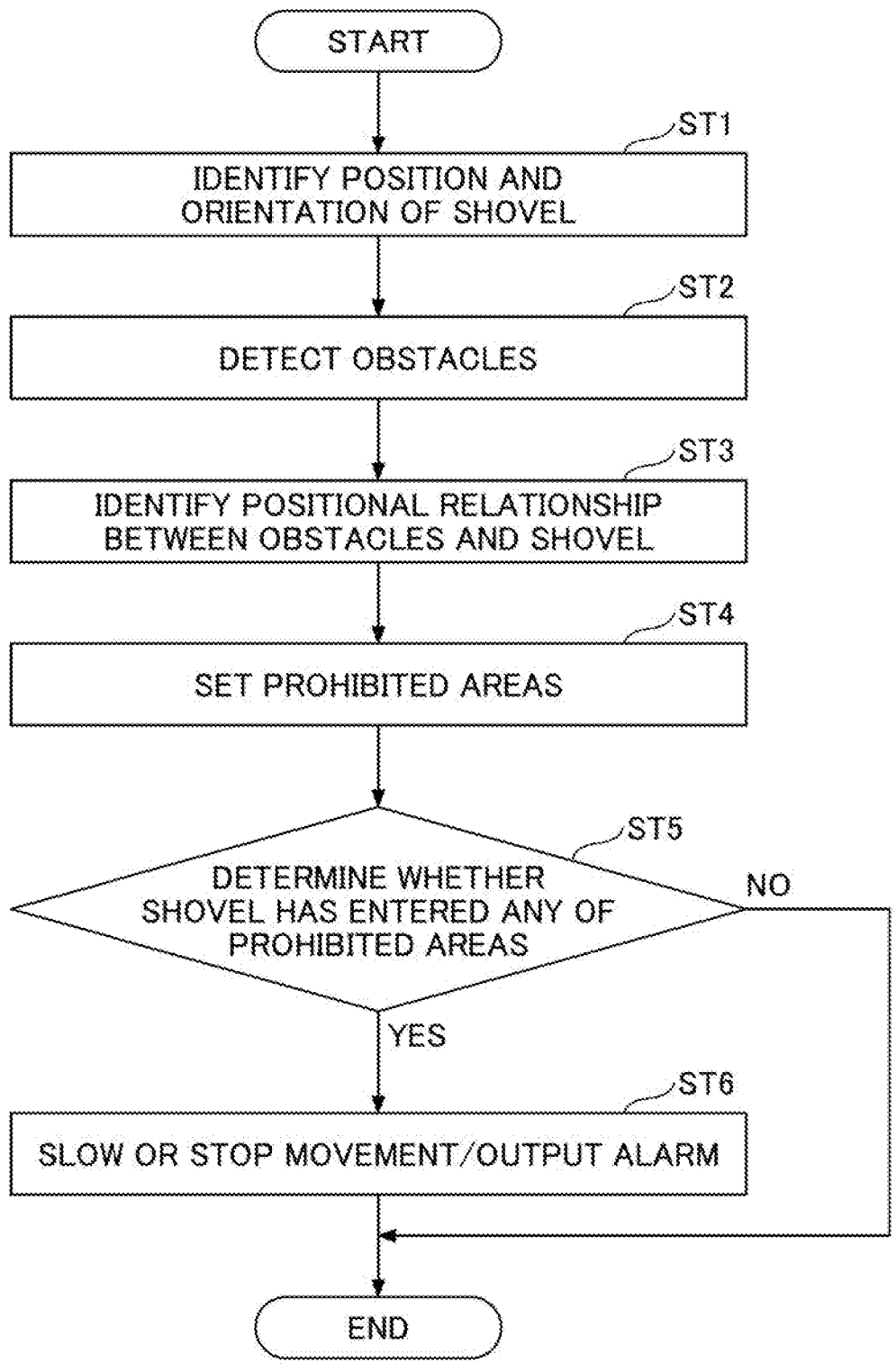
FIG. 6 is a flowchart illustrating an example of a prohibited area setting process.

Next, referring to FIG. 4 through FIG. 6, an example process in which the controller 30 sets a prohibited area based on information of an obstacle detected by the obstacle detector 90 (hereinafter referred to as a "prohibited area setting process") will be described. FIG. 6 is a flowchart illustrating an example of the prohibited area setting process.

In step ST1, the orientation identifying unit 301 identifies the position and orientation of the shovel 100. In the present embodiment, the orientation identifying unit 301 identifies the position of the shovel 100 based on position information of the shovel 100 detected by the GPS device P1. Further, the orientation identifying unit 301 identifies the orientation of the shovel 100 based on the rotation angle of the boom 4 detected by the boom angle sensor S1, the rotation angle of the arm 5 detected by the arm angle sensor S2, and the rotation angle of the bucket 6 detected by the bucket angle sensor S3. Note that the orientation identifying unit 301 may identify the orientation of the shovel 100 by using the body inclination sensor S4. Further, the orientation identifying unit 301 may identify the relative position between the lower traveling body 1 and the upper turning body 3 by using an orientation detector. For example, the orientation detector may be configured by a combination of a direction sensor attached to the lower traveling body 1 and a direction sensor attached to the upper turning body 3, or may be configured by a turning angular velocity sensor. The turning angular velocity sensor may be attached to, for example, a center joint provided in relation to the mechanism that achieves relative rotation between the lower traveling body 1 and the upper turning body 3. Further, in a configuration in which the upper turning body 3 is driven to turn by a turning motor generator, the orientation detector may be configured by a resolver.

In step ST2, the obstacle detector 90 detects obstacles in the vicinity of the shovel 100. In the present embodiment, the obstacle detector 90 detects obstacles such as a utility pole, a power line, a road boundary fence, and a road cone. For example, as illustrated in FIG. 4, the utility pole image 411, the power line image 412, the road boundary fence image 413, and the road cone image 414 are superimposed on the arrangement drawing displayed on the image display unit 41 of the display device 40.

Figure 8:
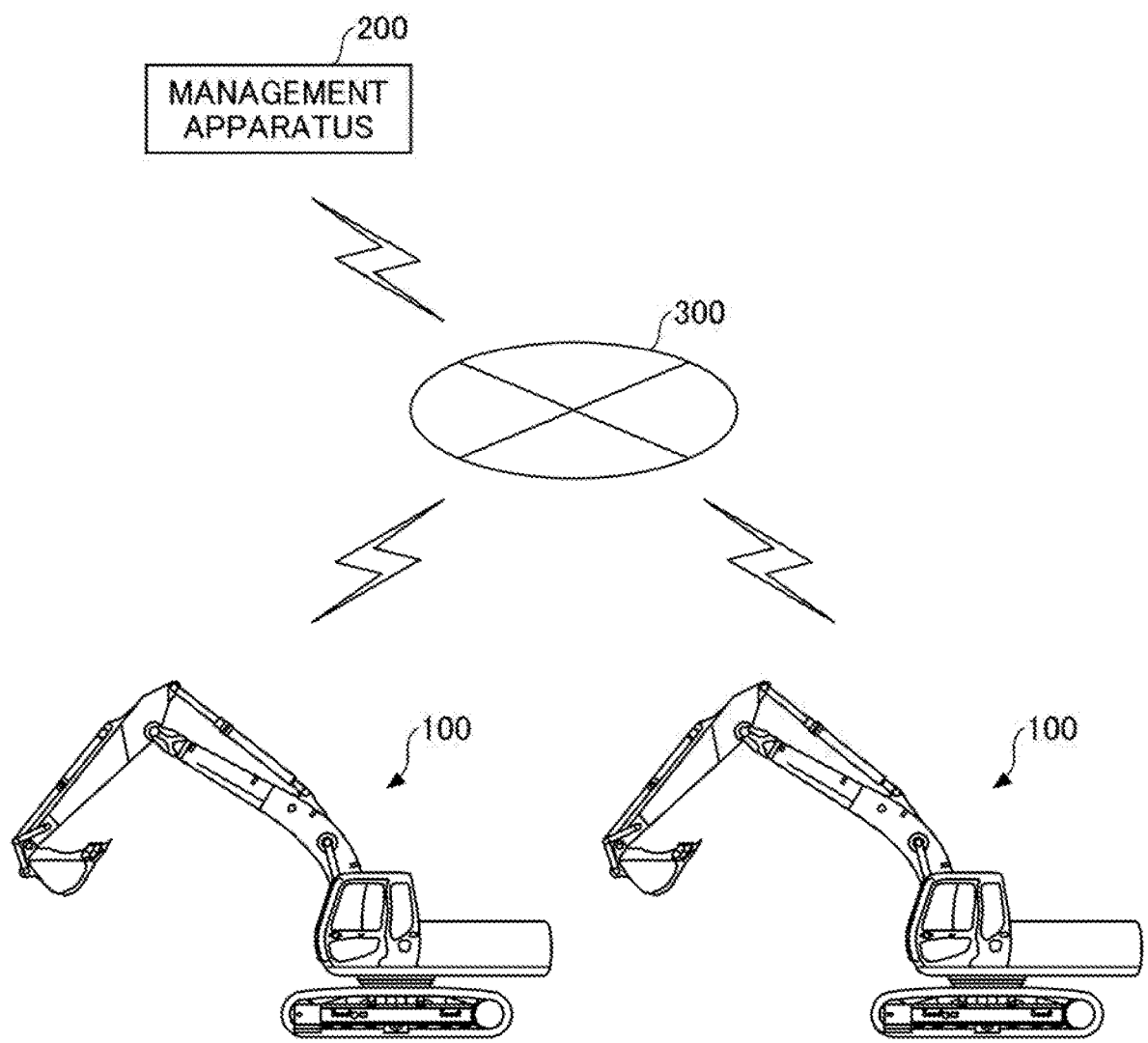
FIG. 8 is a network diagram including the shovel of FIG. 1A.

In step ST3, the positional relationship identifying unit 302 identifies the positional relationship between the obstacles and the shovel 100. In the present embodiment, the positional relationship identifying unit 302 identifies the positional relationship between the obstacles and the shovel 100 based on position information of the obstacles detected by the obstacle detector 90 and position information of the shovel 100 identified by the orientation identifying unit 301. Further, the positional relationship between the obstacles and the shovel 100, identified by the positional relationship identifying unit 302, may be transmitted to the outside of the shovel 100 via the transmitter T1. In the present embodiment, the positional relationship between the obstacles and the shovel 100, identified by the positional relationship identifying unit, may be transmitted via the transmitter T1 to a management apparatus 200 that can communicate with the shovel 100 via a network 300 as illustrated in FIG. 8.

In step ST4, the prohibited area setting unit 303 sets prohibited areas based on the positional relationship between the obstacles and the shovel 100 identified by the positional relationship identifying unit. In the present embodiment, for example, the prohibited areas are set as predetermined ranges including the utility pole, the power line, the road boundary fence, and the road cone detected as the obstacles by the obstacle detector 90. Specifically, the prohibited areas 421, 422, 423, and 424 are set as respective predetermined ranges including the utility pole image 411, the power line image 412, the road boundary fence image 413, and the road cone image 414 on the arrangement drawing displayed on the image display unit 41 of the display device 40. In the present embodiment, the prohibited areas, set on the arrangement drawing or the construction plan drawing by the prohibited area setting unit 303, may be transmitted via the transmitter T1 to the management apparatus 200 that can communicate with the shovel 100 via the network 300 as illustrated in FIG. 8. Further, the arrangement drawing on which the prohibited areas are set may be transmitted from the management apparatus 200 to another shovel 100.

In step ST5, the entry determining unit. 304 determines whether the shovel 100 has entered any of the prohibited areas set by the prohibited area setting unit 303. If the entry determining unit 304 determines that the shovel 100 has entered any of the prohibited areas, the process proceeds to step ST6. Conversely, if the entry determining unit 304 determines that the shovel 100 has not entered any of the prohibited areas, the process ends.

In step ST6, the operation control unit 305 slows or stops the movement of the shovel 100. Then, the process ends.

According to the present embodiment, the controller 30 slows or stops the movement of the shovel 100 when the shovel 100 has entered a prohibited area. Accordingly, the operator can operate the shovel 100 without excessively paying attention to obstacles such as utility poles and power lines, thus improving work efficiency.

Further, the prohibited areas set in the above-described prohibited area setting process may be configured to be reset by the prohibited area resetting unit 306. In the present embodiment, when a prohibited area to be reset is selected through the input device 45, the prohibited area resetting unit 306 resets the selected prohibited area. Further, when an obstacle is no longer located in a prohibited area, the prohibited area may be displayed by a dashed line or a different color such that the prohibited area can be distinguished from other prohibited areas. In this case, when the prohibited area, where the obstacle is no longer located, is selected through the input device 45, the prohibited area resetting unit 306 may reset the prohibited area where the obstacle is no longer located.

Figure 7:
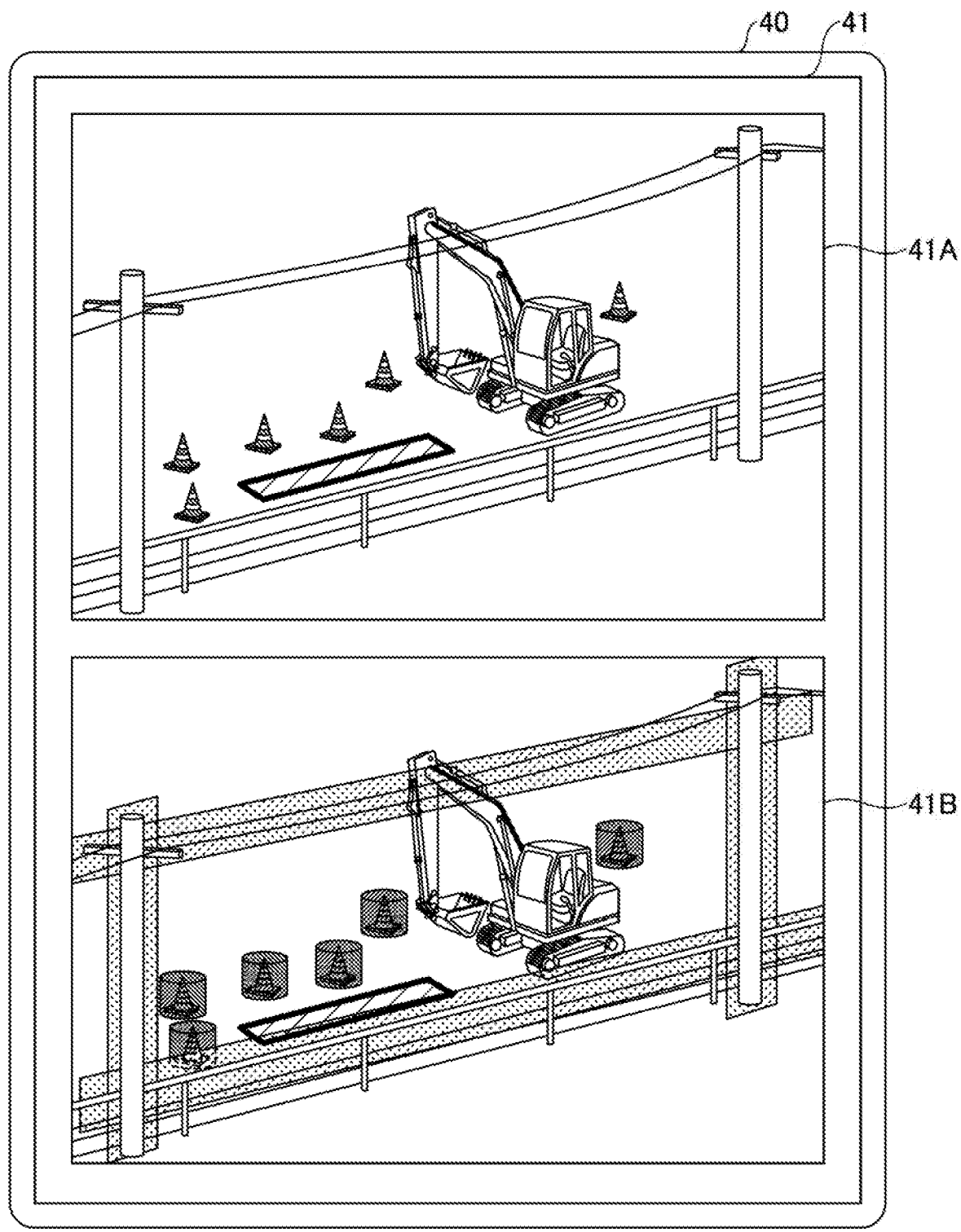
FIG. 7 is a diagram illustrating another example image of the arrangement drawing after the prohibited areas are set.

Next, referring to FIG. 7, example images displayed on the image display unit 41 of the display device 40 will be described. FIG. 7 is a diagram illustrating another example image of the arrangement drawing after the prohibited areas are set.

In the example illustrated in FIG. 7, the image display unit 41 of the display device 40 simultaneously displays an image 41A of the arrangement drawing before the prohibited areas are set and an image 41B of the arrangement drawing after the prohibited areas are set. Accordingly, the operator can readily check a new prohibited area set in the prohibited area setting process by checking an image displayed on the image display unit 41.

Note that, if a point on the outer surface of the shovel 100 enters a prohibited area, the controller 30 may be configured to determine that there is a possibility that a part of the shovel 100 may enter the prohibited area. The outer surface of the shovel 100 may include the outer surface of the lower traveling body 1, the outer surface of the upper turning body 3, and the outer surface of the excavation attachment AT. The positional relationship between the orientation sensors versus the outer surface of the lower traveling body 1, the outer surface of the upper turning body 3, and the outer surface of the excavation attachment AT is preliminarily set in the controller 30. Therefore, the controller 30 can calculate changes in the positions of the outer surface of the lower traveling body 1, the outer surface of the upper turning body 3, and the outer surface of the excavation attachment AT, by calculating changes in the positions of the orientation sensors in predetermined periods.

Specifically, the controller 30 uses a hypothetical three-dimensional model, such as a polygon model or a wireframe model, to identify the three-dimensional overall outline (outer surface) of the shovel 100, and calculates the coordinates of points on the outer surface of the shovel 100. The outer surface of the lower traveling body 1 includes, for example, the front surface, the upper surface, the lower surface, and the rear surface of the crawlers 1C. The outer surface of the upper turning body 3 includes, for example, the surface of a side cover, the upper surface of the engine hood, and the upper surface, the left side surface, the right side surface, and the rear surface of the counterweight. The outer surface of the excavation attachment AT includes, for example, the rear surface, the left side surface, the right side surface, and the inner surface of the boom 4, and also includes the rear surface, the left side surface, the right side surface, and the inner surface of the arm 5.

Figure 9A:
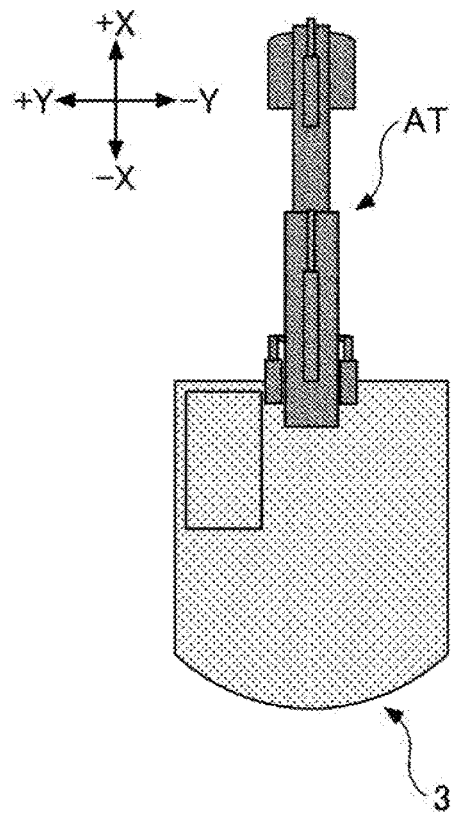
FIG. 9A through FIG. 9C are diagrams illustrating configuration examples of outer surfaces of the shovel.
Figure 9B:
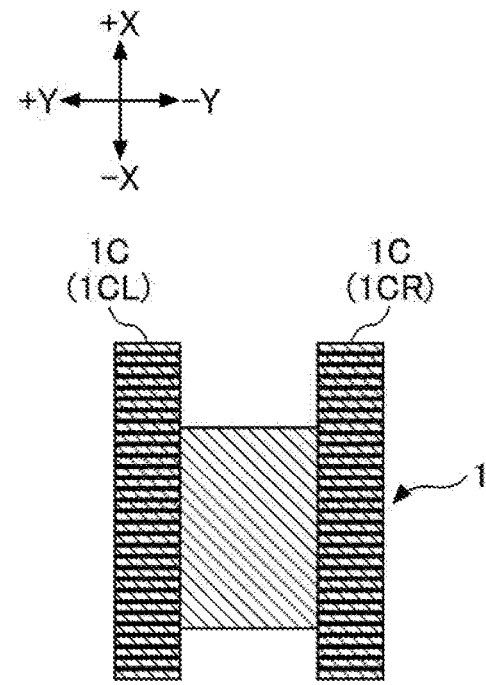
Figure 9C:
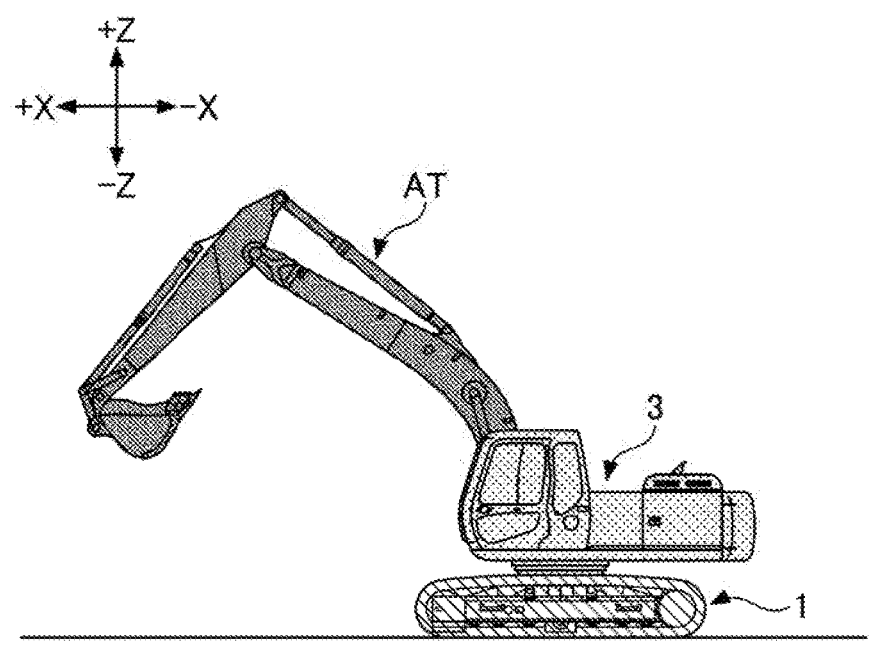
Figure 10:
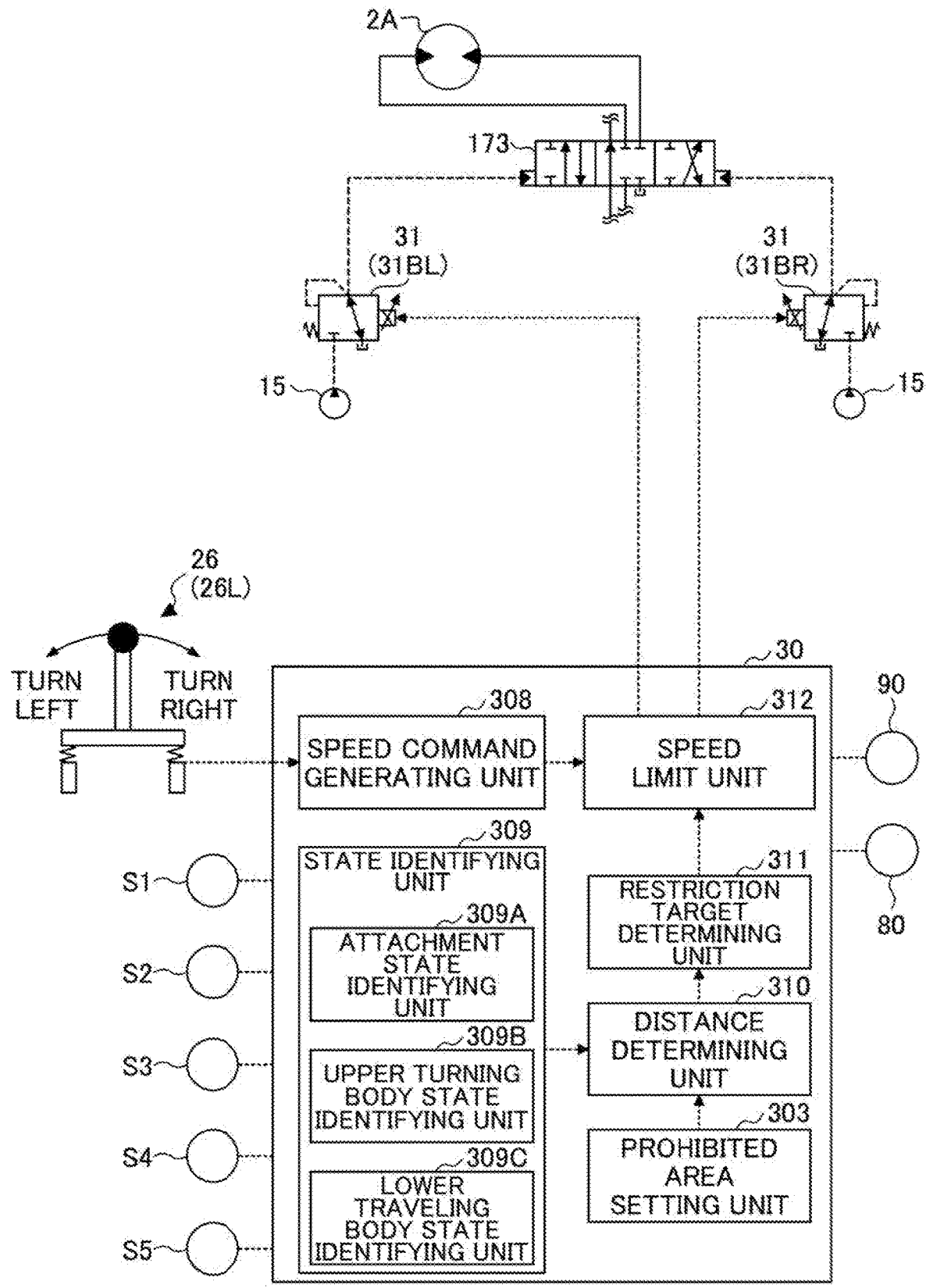
FIG. 10 is a diagram illustrating another example configuration of a controller.

FIG. 9A through FIG. 9C are diagrams illustrating configuration examples of outer surfaces of polygon models of the shovel 100. FIG. 9A is a top view of a polygon model of the upper turning body 3 and the excavation attachment AT. FIG. 9B is a top view of a polygon model of the lower traveling body 1. FIG. 9C is a left side view of a polygon model of the shovel 100. In FIG. 9A through FIG. 9C, the outer surface of the lower traveling body 1 is represented by diagonal lines, the outer surface of the upper turning body 3 is represented by a rough dot pattern, and the outer surface of the excavation attachment AT is represented by a fine dot pattern.

The outer surface of each of the polygon models of the shovel 100 may be identified as a surface located outward by a predetermined margin distance relative to the actual outer surface of the shovel 100. That is, the polygon models of the shovel 100 may be identified as respective enlarged models of the lower traveling body 1, the upper turning body 3, and the excavation attachment AT.

In this case, the predetermined margin distance may be a distance that varies in accordance with the movement of the shovel 100 (e.g., the movement of the excavation attachment AT). The controller 30 may output an alarm when a prohibited area falls within a space represented by the enlarged polygon models of the shovel 100, and may slow or stop the movement of the shovel 100 by means of restriction control.

For example, the controller 30 may separately determine whether there is a possibility that three portions (the outer surface of the lower traveling body 1, the outer surface of the upper turning body 3, and the outer surface of the excavation attachment AT) constituting the outer surface of the shovel 100 may enter a prohibited area. For at least one of the three portions of the shovel 100, the controller 30 is not required to determine whether there is a possibility of entering a prohibited area.

In the example illustrated in FIG. 5, the controller 30 may calculate distances between points on the outer surface of the excavation attachment AT and the prohibited areas 421, 422, 423, and 424 for each predetermined control period, and may determine whether there is a possibility that the bucket 6 may enter the prohibited areas 421, 422, 423, and 424 based on the calculated distances. In this case, the controller 30 is not required to calculate distances between points on the outer surface of the lower traveling body 1 and the prohibited areas 421, 422, 423, and 424, and distances between points on the outer surface of the upper turning body 3 and the prohibited areas 421, 422, 423, and 424.

Referring to FIG. 10, an example of a restriction function will be described, in which the movement of the shovel 100 (turning hydraulic motor 2A) is restricted based on the distance between each of the three portions constituting the outer surface of the shovel 100 and an object detected by the obstacle detector 90, which serves as the surroundings monitoring device. FIG. 10 is a diagram illustrating another example configuration of a controller 30. Note that the surroundings monitoring device may be the image capturing device 80.

In the example illustrated in FIG. 10, the controller 30 includes a prohibited area setting unit 303, a speed command generating unit 308, a state identifying unit 309, a distance determining unit 310, a restriction target determining unit 311, and a speed limit unit 312, as functional elements. The controller 30 is configured to receive signals output from the boom angle sensor S1, the arm angle sensor S2, the bucket angle sensor S3, the body inclination sensor S4, the turning angular velocity sensor S5, an electrical left operating lever 26L, the image capturing device 80, and the obstacle detector 90, execute various computations, and output control commands to a proportional valve 31 and the like. The prohibited area setting unit 303 of FIG. 10 operates in the same manner as the prohibited area setting unit 303 included in the controller 30 illustrated in FIG. 3.

The speed command generating unit 308 is configured to generate a command related to the movement speed of each actuator based on a signal output from the operation device 26. In the example illustrated in FIG. 10, the speed command generating unit 308 is configured to generate a command related to the rotational speed of the hydraulic motor 2A based on an electrical signal output from the left operating lever 26L that is operated in the horizontal direction.

The state identifying unit 309 is configured to identify the current state of the shovel 100. Specifically, the state identifying unit 309 includes an attachment state identifying unit 309A, an upper turning body state identifying unit 309B, and a lower traveling body state identifying unit 309C.

The attachment state identifying unit 309A is configured to identify the current state of the excavation attachment AT. Specifically, the attachment state identifying unit 309A is configured to calculate the coordinates of predetermined points on the outer surface of the excavation attachment AT. Examples of the predetermined points include all vertexes of the excavation attachment AT.

The upper turning body state identifying unit 309B is configured to identify the current state of the upper turning body 3. Specifically, the upper turning body state identifying unit 309B is configured to calculate the coordinates of predetermined points on the outer surface of the upper turning body 3. Examples of the predetermined points include all vertexes of the upper turning body 3.

The lower traveling body state identifying unit 309C is configured to identify the current state of the lower traveling body 1. Specifically, the lower traveling body state identifying unit 309C is configured to calculate the coordinates of predetermined points on the outer surface of the lower traveling body 1. Examples of the predetermined points include all vertexes of the lower traveling body 1.

The state identifying unit 309 may determine to identify any of the states of the three portions (the outer surface of the lower traveling body 1, the outer surface of the upper turning body 3, and the outer surface of the excavation attachment AT) constituting the outer surface of the shovel 100, or determine not to identify any of the states of the three portions.

The distance determining unit 310 is configured to determine whether the distance between each point on the outer surface of the shovel 100, calculated by the state identifying unit 309, and a prohibited area, set by the prohibited area setting unit 303, falls below a predetermined value.

The restriction target determining unit 311 is configured to determine a restriction target. In the example illustrated in FIG. 10, the restriction target determining unit 311 determines which actuator (hereinafter referred to as a "restriction target actuator") should be restricted in movement based on the output of the distance determining unit 310, namely based on whether the distance between any of the points on the outer surface of the shovel 100 and the prohibited area falls below the predetermined value.

The speed limit unit 312 is configured to limit the movement speed of one or more actuators. In the example illustrated in FIG. 10, among speed commands generated by the speed command generating unit 308, the speed limit unit 312 changes a speed command related to an actuator, which has been determined as a restriction target actuator by the restriction target determining unit 311, and outputs a control command, corresponding to the changed speed command, to the proportional valve 31.

Specifically, the speed limit unit 312 changes a speed command related to the turning hydraulic motor 2A, which has been determined as a restriction target actuator by the restriction target determining unit 311, and outputs a control command, corresponding to the changed speed command, to a proportional valve 31BL or a proportional valve 31BR. In this manner, the rotational speed of the turning hydraulic motor 2A can be reduced or stopped.

With the above-described restriction function, the controller 30 illustrated in FIG. 10 can slow or stop the movement of an actuator in order to prevent the entry of a part of the shovel 100 into a prohibited area.

Figure 11:
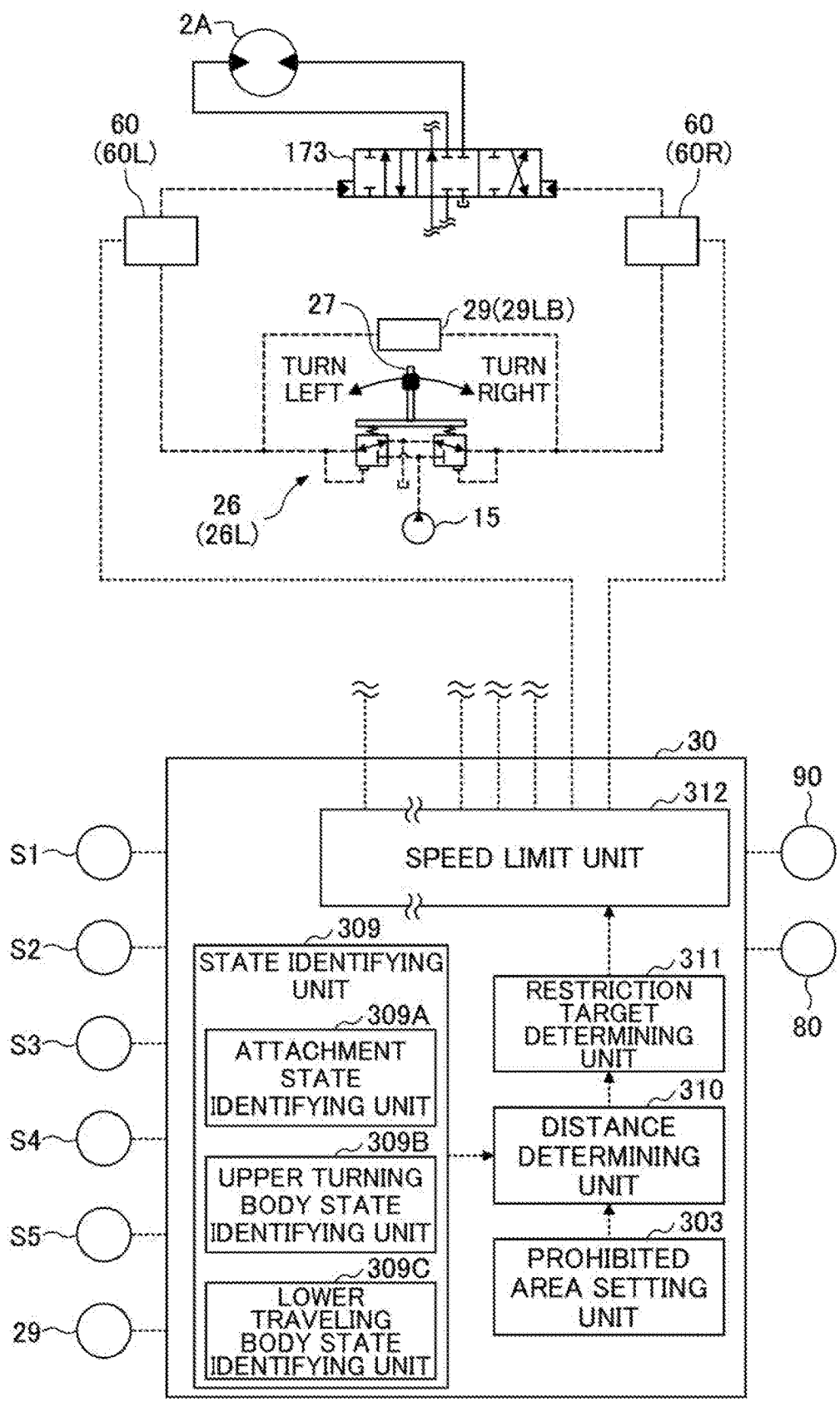
FIG. 11 is a diagram illustrating yet another example configuration of a controller.

Next, referring to FIG. 11, another example of the restriction function will be described, in which the movement of the shovel 100 (turning hydraulic motor 2A) is restricted based on the distance between each of the three portions constituting the outer surface of the shovel 100 and an object detected by the obstacle detector 90, which serves as the surroundings monitoring device. FIG. 11 is a diagram illustrating yet another example configuration of a controller 30. Note that the surroundings monitoring device may be the image capturing device 80.

The controller 30 illustrated in FIG. 11 differs from the controller 30 illustrated in FIG. 10, in that the controller 30 illustrated in FIG. 11 is connected to a hydraulic operating lever including a hydraulic pilot circuit while the controller 30 illustrated in FIG. 10 is connected to the electrical operating lever including a hydraulic pilot circuit. Specifically, a speed limit unit 312 of the controller 30 illustrated in FIG. 11 generates speed commands based on outputs of an operating pressure sensor 29, and the speed limit unit 312 changes, among the generated speed commands, a speed command related to an actuator that has been determined as a restriction target actuator by a restriction target determining unit 311. Then, the speed limit unit 312 outputs a control command, corresponding to the changed speed command, to a solenoid valve 60 related to the actuator.

The solenoid valve 60 includes a solenoid valve 60L and a solenoid valve 60R. In the example illustrated in FIG. 11, the solenoid valve 60L is an electromagnetic proportional valve placed in a conduit connecting a left-side port of a remote control valve, which discharges hydraulic oil when the left operating lever 26L is operated in the horizontal direction, to a left-side pilot port of a control valve 173. The solenoid valve 60R is an electromagnetic proportional valve placed in a conduit connecting a right-side port of a remote control valve, which discharges hydraulic oil when the left operating lever 26L is operated in the horizontal direction, to a right-side pilot port of the control valve 173.

Specifically, the speed limit unit 312 changes a speed command related to the turning hydraulic motor 2A, which has been determined as a restriction target actuator by the restriction target determining unit 311, and outputs a control command, corresponding to the changed speed command, to the solenoid valve 60L or the solenoid valve 60R. In this manner, the rotational speed of the turning hydraulic motor 2A can be reduced or stopped.

Similar to the controller 30 illustrated in FIG. 10, with the above-described restriction function, the controller 30 illustrated in FIG. 11 can slow or stop the movement of an actuator in order to prevent the entry of a part of the shovel 100 into a prohibited area. Further, if the bucket approaches a utility pole while the operator is paying attention to the crawler during the traveling operation of the shovel 100, the shovel 100 can be stopped. Further, the controller 30 may perform avoidance control such that the entry of the shovel 100 into a prohibited area is prevented by driving a given actuator. In this case, if the bucket approaches a utility pole while the operator is paying attention to the crawler during the traveling operation of the shovel 100, turning control may be automatically performed such that the bucket is moved away from the utility pole.

Figure 12:
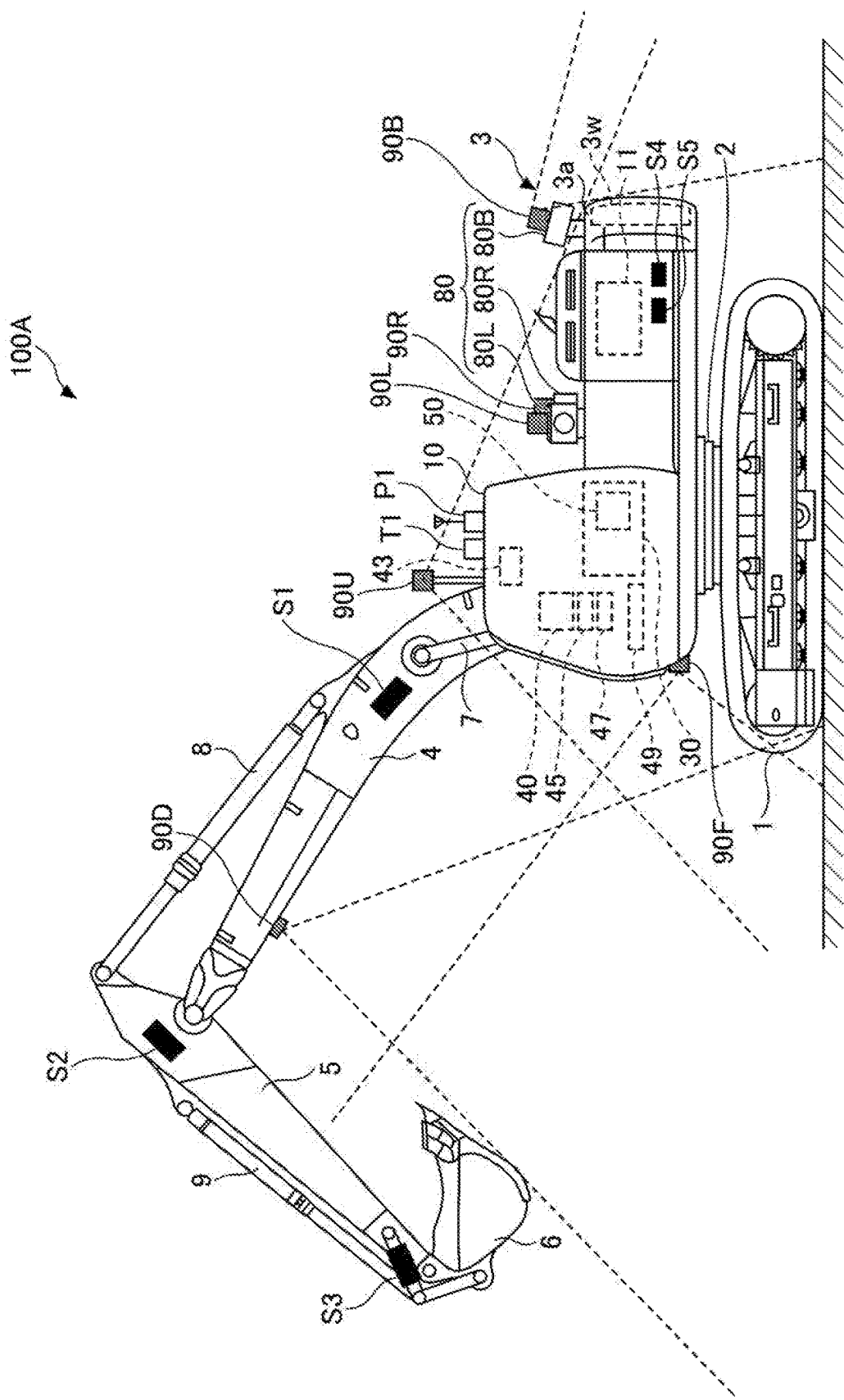
FIG. 12 is a side view of an example of a shovel according to another embodiment of the present invention.

Next, the overall configuration of an example of a shovel 100A according to another embodiment of the present embodiment will be described. FIG. 12 is a side view of an example of the shovel 100A according to the embodiment of the present embodiment.

The shovel 100A according to the present embodiment includes an obstacle detector 90 configured to detect an obstacle located within a range including the top of the cabin 10 and a blind spot from the top of the cabin 10. Other configurations of the shovel 100A are similar to those of the shovel 100 according to the above-described embodiment, and thus a description of the configurations of the shovel 100A similar to those of the shovel 100 will not be provided.

The obstacle detector 90 includes a sensor 90U, a sensor 90D, a sensor 90F, a sensor 90L, a sensor 90R, and a sensor 90B.

The sensor 90U is disposed on the top of the cabin 10 to detect an obstacle in the vicinity of the shovel 100A. The sensor 90D is disposed on the lower side of the boom 4 to detect an obstacle located within a range including a blind spot in front of the shovel 100A when viewed from the top of the cabin 10. The sensor 90F is disposed at the front of the cabin 10 to detect an obstacle located within a range including a blind spot in front of the shovel 100A when viewed from the top of the cabin 10. The sensors 90L, 90R, and 90B are disposed on the top of the cover 3a of the upper turning body 3 to detect obstacles located within ranges including blind spots on the left side, the right side, and the rear side of the cabin 10 when viewed from the top of the cabin 10. The sensor 90U, the sensor 90D, the sensor 90F, the sensor 90L, the sensor 90R, and the sensor 90B may be cameras such as monocular cameras or stereo cameras, milliwave radars, or laser radars, and transmit respective detection signals to the controller 30.

In the shovel 100A according to the present embodiment, the controller 30 slows or stops the movement of the shovel 100A when the shovel 100A has entered a prohibited area. Accordingly, the operator can operate the shovel 100A without excessively paying attention to obstacles such as utility poles and power lines at a work site, thus improving work efficiency.

In particular, in the present embodiment, in addition to the sensor 90U disposed on the top of the cabin 10, the sensor 90D, the sensor 90F, the sensor 90L, the sensor 90R, and the sensor 90B are disposed to detect obstacles located within ranges including blind spots from the top of the cabin 10. Therefore, it is possible to detect an obstacle in the vicinity of the shovel 100A, which tends to be a blind spot from the operator.

Although the embodiments of the present invention have been described above, the present invention is not limited to the above-described embodiments. Various modifications and variations may be made without departing from the scope of the present invention.

For example, in the above-described embodiments, the controller 30 sets a prohibited area for an obstacle displayed on an arrangement drawing or a construction plan drawing; however, the controller 30 may set a prohibited area even when there is no arrangement drawing. Specifically, an image captured by the image capturing device 80 may be displayed on the screen, and an obstacle detected by the obstacle detector 90 may be superimposed on the captured image. Then, a prohibited area is set for the obstacle superimposed on the captured image.

Figure 13:
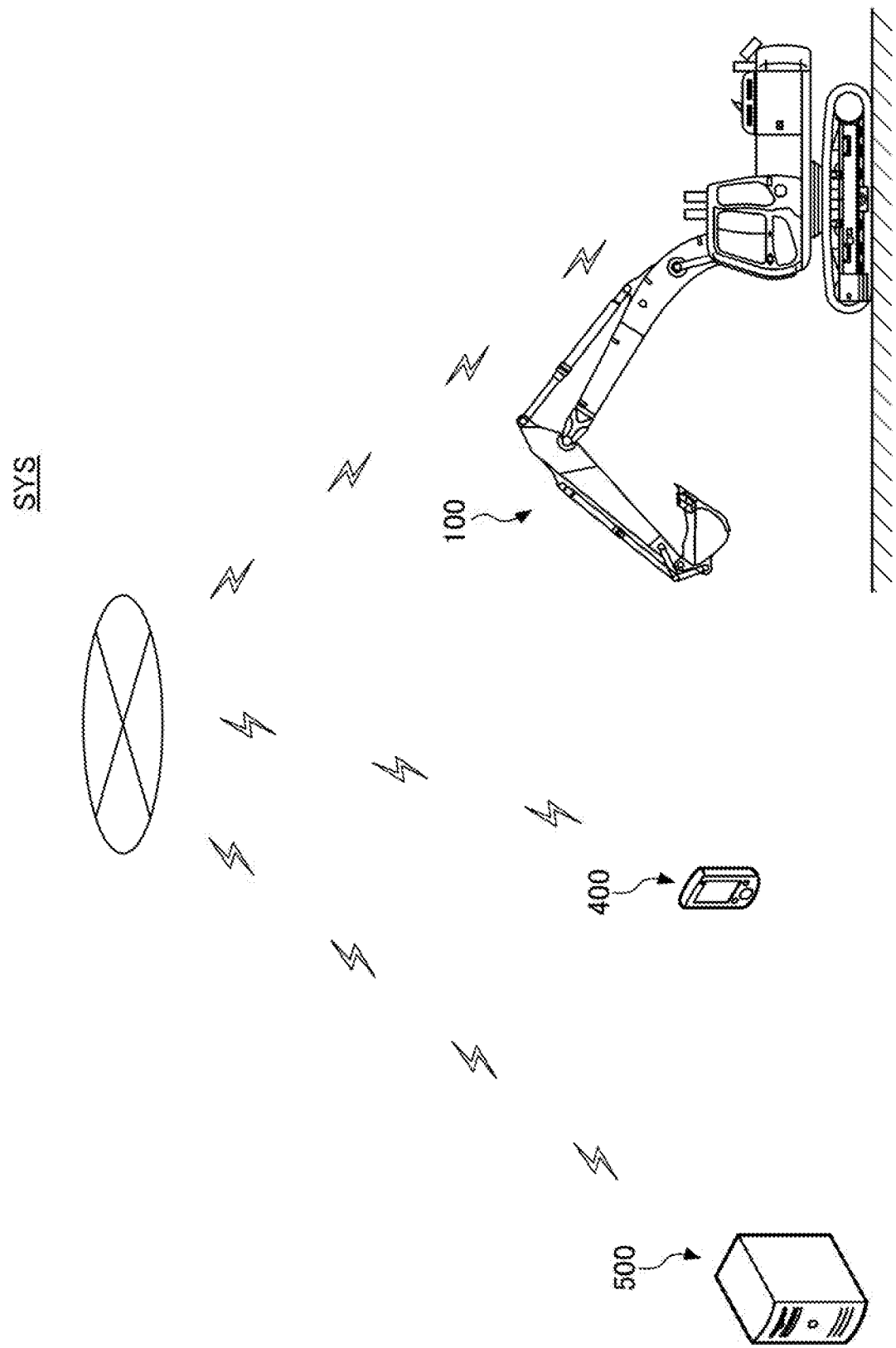
FIG. 13 is a schematic diagram illustrating an example configuration of a shovel management system.

Further, information acquired by a shovel 100 may be shared with a manager or an operator of another shovel via a shovel management system SYS as illustrated in FIG. 13. FIG. 13 is a schematic diagram illustrating an example configuration of the shovel management system SYS. The management system SYS is a system that manages a shovel 100. According to the present embodiment, the management system SYS is mainly configured by a shovel 100, an assist device 400, and a management apparatus 500. Each of the shovel 100, the assist device 400, and the management apparatus 500 includes a communications device. The shovel 100, the assist device 400, and the management apparatus 500 includes a communications device are directly or indirectly connected to each other via a cellular phone communication network, a satellite communication network, or a near field communication network. The management system SYS may include one or more shovels 100, one or more assist devices 400, and one or more management apparatuses 500. In the example illustrated in FIG. 13, the management system SYS includes the one shovel 100, the one assist device 400, and the one management apparatus 500.

The assist device 400 is typically a portable terminal device, and may be, for example, a computer carried by a worker or the like at a work site, such as a notebook personal computer (PC), a tablet PC, or a smartphone. The assist device 400 may be a computer carried by the operator of the shovel 100. Alternatively, the assist device 400 may be a stationary terminal apparatus.

The management apparatus 500 is typically a stationary terminal apparatus, and may be, for example, a server computer installed in a management center or the like outside a work site. The management apparatus 500 may be a portable computer (for example, a portable terminal device such as a notebook PC, a tablet PC, or a smartphone).

At least one of the assist device 400 and the management apparatus 500 (hereinafter referred to as the "assist device 400 or the like") may include a monitor and a remote operation device. In this case, the operator operates the shovel 100 while using the remote operation device. The remote operation device is connected to the controller 30 via a communication network such as a cellular phone communication network, a satellite communication network, or a near field communication network.

In the above-described shovel management system SYS, the controller 30 of the shovel 100 may transmit information related to prohibited areas to the assist device 400. The information related to prohibited areas includes at least one of information related to the positions of the prohibited areas, information related to the time (hereinafter referred to as the "determination time") at which it is determined that there is a possibility that a part of the shovel 100 may enter a prohibited area, information related to the position of the part of the shovel 100 at the determination time, information related to work contents of the shovel 100 at the determination time, information related to the work environment of the shovel 100 at the determination time, and information related to the movement of the shovel 100 measured at the determination time and measured for a period of time before and after the determination time. The information related to the work environment of the shovel 100 includes at least one of information related to the inclination of the ground surface and information related to the weather. The information related to the movement of the shovel 100 includes at least one of a pilot pressure and the pressure of hydraulic oil in a hydraulic actuator.

The controller 30 may transmit an image captured by the image capturing device 80 to the assist device 400. The image captured by the image capturing device 80 may include a plurality of images captured for a predetermined period of time including the determination time. The predetermined period of time may include a period of time prior to the determination time.

Further, the controller 30 may transmit at least one of information related to work contents of the shovel 100 performed for a predetermined period of time including the determination time, information related to the orientation of the shovel 100, and information related to the orientation of the excavation attachment, to the assist device 400. As a result, it becomes possible for the manager using the assist device 400 and the like to acquire information related to a work site. That is, the manager can analyze the cause of a situation in which the movement of the shovel 100 is slowed or stopped. Further, the manager can improve the work environment of the shovel 100 based on the analysis results.

Further, the controller 30 may be configured such that the operator can change the position of a prohibited area or generate a new prohibited area.

Typically, the information related to prohibited areas is temporarily stored in a volatile storage device or a nonvolatile storage device of the controller 30, and is transmitted to the management apparatus 500 at any timing.

The management apparatus 500 is configured to present the received information related to prohibited areas to the user of the management apparatus 500, such that the user can grasp the situation of the work site. In the present embodiment, the management apparatus 500 is configured to visually produce the situation of the work site when an object is detected in a detection space. Specifically, the management apparatus 500 uses the received information related to prohibited areas to generate a computer graphics animation. The term "computer graphics" is hereinafter referred to as "CG".

Figure 14:
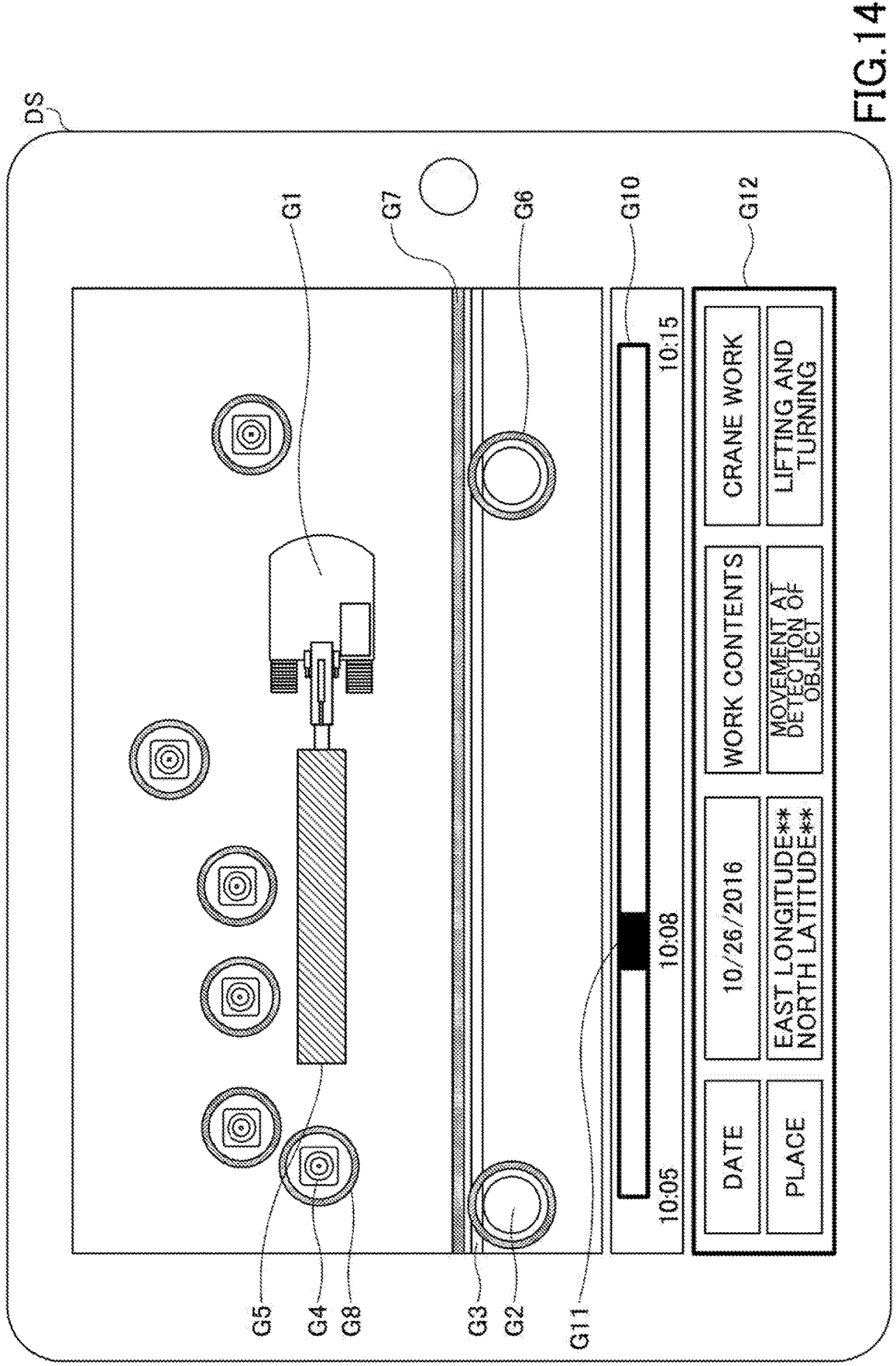
FIG. 14 is a diagram illustrating a display example of a CG animation.

FIG. 14 illustrates a display example of a CG animation produced by the management apparatus 500. The CG animation is an example of a playback image of a work site, and is displayed on a display device DS connected to the management apparatus 500. The management apparatus 500 may be a touch panel monitor.

The CG animation illustrated in FIG. 14 is a CG animation viewed from the top of a shovel 100 as illustrated in FIG. 5, and includes images G1 through G12. A plurality of obstacle detectors are mounted on the shovel 100 as illustrated in FIG. 5 to monitor the vicinity of the shovel 100. Therefore, the controller 30 and the management apparatus 500, which receives information from the controller 30, can accurately acquire information on the positional relationship between the shovel 100 and an object located in the vicinity of the shovel 100.

The image G1 is a CG image representing the shovel 100. The image G2 is a CG image representing a utility pole. The image G3 is a CG image representing a power line and a road boundary fence. The image G4 is a CG image representing a road cone. The image G5 is a CG image representing a buried object. The image G6 is a frame image surrounding the image G2, and represents a prohibited area for the utility pole, which is an obstacle. The image G7 is an image extending along the image G3 and located on the shovel 100 side of the image G3, and represents a prohibited area for the power line and the road boundary fence, which are obstacles. The image G8 is a frame image surrounding the image G4, and represents a prohibited area for the road cone, which is an obstacle. The image G10 is a seek bar that displays a playback position of the CG animation. The image G11 is a slider that indicates the current playback position of the CG animation. The image G12 is a text image indicating various information. The images G2 through G8 may be images captured by the image capturing device 80 and subjected to viewpoint change processing. That is, instead of the CG animation, the management apparatus 500 may display a moving image, captured by the image capturing device 80, on the display device DS as the playback image of the work site. Further, in the example of FIG. 14, the power line and the road boundary fence are represented as the one image G3; however, the power line and the road boundary fence may be represented as separate CG images. Further, the prohibited area for the power line and the road boundary fence is represented as the one image G7; however, prohibited areas for the power line and the road boundary fence may be represented as respective images.

In the example of FIG. 14, the image G12 includes a text image "Oct. 26, 2016" indicating the date on which work was performed, a text image "east longitude north latitude" indicating the place in which the work was performed, a text image "crane work" indicating work contents, and a text image "lifting and turning" indicating the movement of the shovel 100 at the time of detection of an object.

The image G1 is displayed such that the image G1 is moved based on data related to the orientation of the shovel 100 and data related to the orientation of the excavation attachment included in information related to prohibited areas. The data related to the orientation of the shovel 100 includes the pitch angle, the roll angle, and the yaw angle (turning angle) of the upper turning body 3. The data related to the orientation of the excavation attachment includes a boom angle, an arm angle, and a bucket angle.

The user of the management apparatus 500 can change the playback position of the CG animation to a desired position (time) by touching the desired position on the image G10 (seek bar), for example. In FIG. 14, the CG animation of the work site at 10:08 a.m. indicated by the slider is played.

The above-described CG animation allows the manager, the user of the management apparatus 500, to easily grasp the situation of the work site when an object is detected. That is, the manager can analyze the cause of a situation in which the movement of the shovel 100 is restricted. Further, the manager can improve the work environment of the shovel 100 based on the analysis results.

The playback image of the work site, such as a CG animation or a moving image, may be displayed not only on the display device DS connected to the management apparatus 500, but also on a display device of the assist device 400 or a display device 40 provided in the cabin 10 of the shovel 100.

Figure 15:
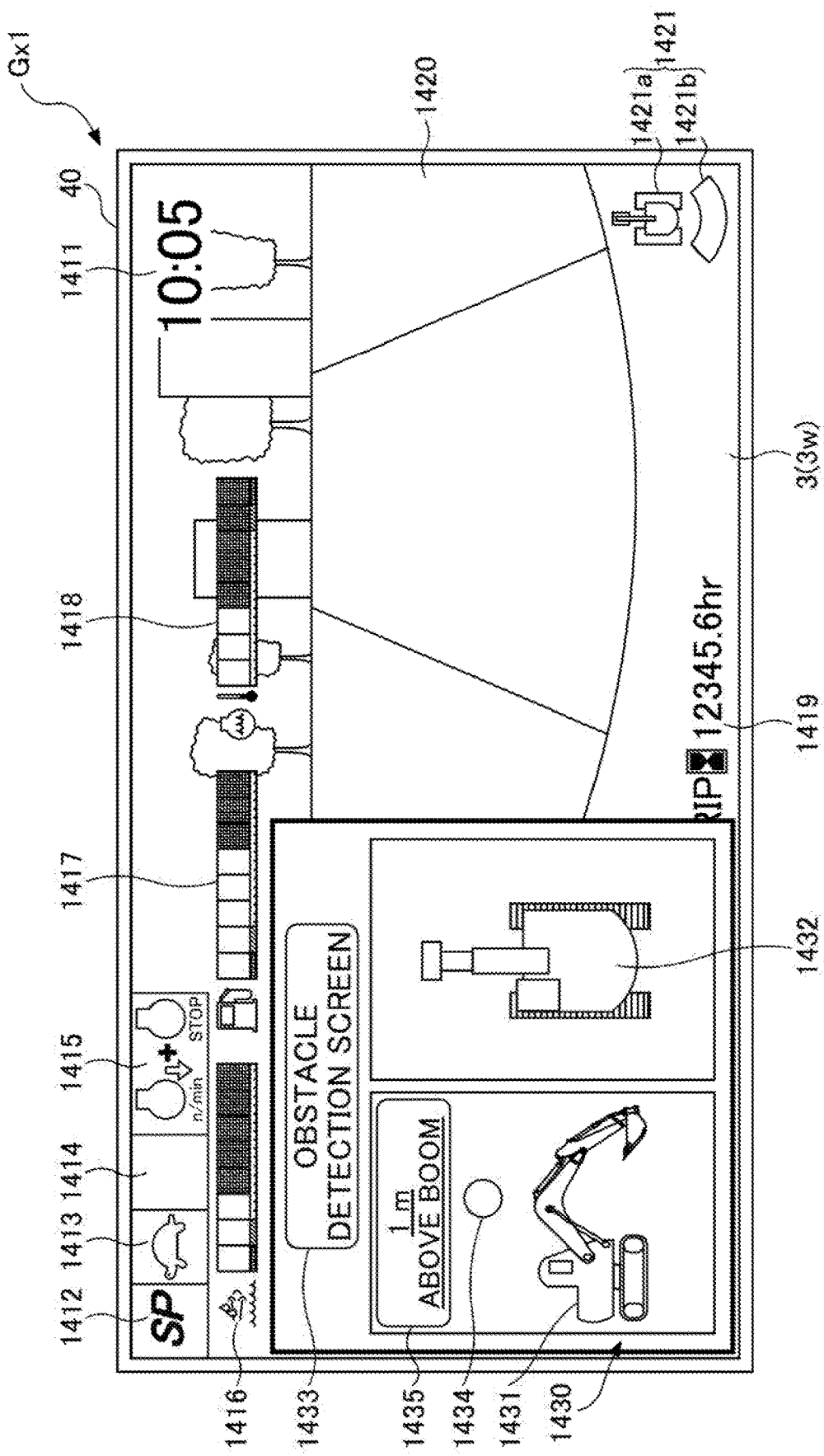
FIG. 15 is a diagram illustrating an example image displayed during the prohibited area setting process.

Next, an example image displayed during the prohibited area setting process will be described with reference to FIG. 15. As illustrated in FIG. 15, an image Gx1 displayed on the display device 40 includes a time display part 1411, a rotational speed mode display part 1412, a traveling mode display part 1413, an attachment display part 1414, an engine control status display part 1415, a remaining aqueous urea solution amount display part 1416, a remaining fuel amount display part 1417, a coolant water temperature display part 1418, an engine operating time display part 1419, a camera image display part 1420, and a work status display part 1430 (including a work status display part in top view and a work status display part in side view). The rotational speed mode display part 1412, the traveling mode display part 1413, the attachment display part 1414, and the engine control status display part 1415 display information related to the settings of the shovel 100. The remaining aqueous urea solution amount display part 1416, the remaining fuel amount display part 1417, the coolant water temperature display part 1418, and the engine operating time display part 1419 display information related to the operating conditions of the shovel 100. Images displayed in the respective parts are generated by the display device 40 based on various data transmitted from the controller 30 and image data transmitted from the image capturing device 80.

The time display part 1411 displays the current time. The rotational speed mode display part 1412 displays a rotational speed mode set by the engine rotational speed adjustment dial (not illustrated) as operating information of the shovel 100. The traveling mode display part 1413 displays a traveling mode as operating information of the shovel 100. The traveling mode represents the settings of traveling hydraulic motors that use variable displacement motors. For example, the traveling mode includes a low-speed mode and a high-speed mode. A "turtle"-shaped mark is displayed during the low-speed mode, and a "rabbit"-shaped mark is displayed during the high-speed mode. The attachment display part 1414 displays an icon representing the type of a currently mounted attachment. The engine control status display part 1415 displays the control status of the engine 11 as operating information of the shovel 100. In the example of FIG. 15, an "automatic deceleration and automatic stop mode" is selected as the control status of the engine 11. The "automatic deceleration and automatic stop mode" means a control status in which the engine rotational speed of the engine 11 is automatically reduced and further the engine 11 is automatically stopped in accordance with the duration of the non-operating state of the engine 11. Other control statuses of the engine 11 include "automatic deceleration mode," "automatic stop mode," and "manual deceleration mode."

The remaining aqueous urea solution amount display part 1416 displays the status of the remaining amount of an aqueous urea solution stored in an aqueous urea solution tank as operating information of the shovel 100. In the example of FIG. 15, a bar gauge representing the current status of the remaining amount of an aqueous urea solution is displayed. The remaining amount of an aqueous urea solution is displayed based on the output data of a remaining aqueous urea solution amount sensor provided in the aqueous urea solution tank.

The remaining fuel amount display part 1417 displays the status of the remaining amount of fuel stored in a fuel tank as operating information of the shovel 100. In the example of FIG. 15, a bar gauge representing the current status of the remaining amount of fuel is displayed. The remaining amount of fuel is displayed based on the output data of a remaining fuel amount sensor provided in the fuel tank.

The coolant water temperature display part 1418 displays the temperature condition of engine coolant water as operating information of the shovel 100. In the example of FIG. 15, a bar gauge representing the temperature condition of engine coolant water is displayed. The temperature of engine coolant water is displayed based on the output data of a water temperature sensor attached to the engine 11.

The engine operating time display part 1419 displays the cumulative operating time of the engine 11 as operating information of the shovel 100. In the example of FIG. 15, the cumulative operating time after the restart of counting by the operator is displayed together with a unit "hr (hour)." The engine operating time display part 1419 may display a lifelong operating time for the entire period after the manufacture of the shovel or a section operating time after the restart of counting by the operator.

The camera image display part 1420 displays an image captured by the image capturing device 80. In the example of FIG. 15, an image captured by the rear camera 80B attached to the rear end of the upper surface of the upper turning body 3 is displayed in the camera image display part 1420. A camera image captured by the left camera 80L attached to the left end of the upper surface of the upper turning body 3 or the right camera 80R attached to the right end of the upper surface of the upper turning body 3 may be displayed in the camera image display part 1420. Further, images captured by two or more of the left camera 80L, the right camera 80R, and the rear camera 80B may be displayed side by side in the camera image display part 1420. A composite image of multiple camera images captured by at least two of the left camera 80L, the right camera 80R, and the rear camera 80B may be displayed in the camera image display part 1420. The composite image may be, for example, an overhead view image.

Each camera is installed such that a part of the upper turning body 3 is included in a camera image. By including a part of the upper turning body 3 in a displayed image, it becomes possible for the operator to easily understand the distance between an object displayed in the camera image display part 1420 and the shovel 100. In the example of FIG. 15, the camera image display part 1420 displays an image of the counterweight 3w of the upper turning body 3.

As illustrated in the example of FIG. 15, the display part in side view allows the operator to visually identify whether the attachment is approaching an obstacle located in an outer region of the attachment, namely in a boom raising direction, an arm opening direction, and a bucket opening direction. Accordingly, it becomes possible for the operator to readily check whether a part of the attachment is approaching an obstacle located in the vertical direction. Further, the work status display part in top view allows the operator to readily identify whether the shovel 100 is approaching an obstacle behind or to the left or to the right of the shovel 100. FIG. 15 depicts the approach of the attachment to the obstacle located in the outer region of the attachment; however, the work status display part 1430 may also display a situation in which the attachment is approaching an obstacle located in an inner region of the attachment, namely in a boom lowering direction, an arm closing direction, or a bucket closing direction. Further, if the crawler of the lower traveling body is approaching an obstacle such as a road cone, the position of the obstacle may be displayed in the work status display part in top view.

The camera image display part 1420 displays a graphic shape 1421 representing the direction of the image capturing device 80 that has captured a currently displayed camera image. The graphic shape 1421 includes a shovel graphic shape 1421a representing the shape of the shovel 100 and a strip-shaped direction indicator graphic shape 1421b representing the imaging direction of the image capturing device 80 that has captured the currently displayed camera image. The graphic shape 1421 is a display part that displays information on the settings of the shovel 100.

In the example of FIG. 15, the direction indicator graphic shape 1421b is displayed below the shovel graphic shape 1421a (on the opposite side from the graphic shape representing the excavation attachment AT). This indicates that an image of an area behind the shovel 100 captured by the rear camera 80B is displayed in the camera image display part 1420. For example, when an image captured by the right camera 80R is displayed in the camera image display part 1420, the direction indicator graphic shape 1421b is displayed to the right of the shovel graphic shape 1421a. For example, when an image captured by the left camera 80L is displayed in the camera image display part 1420, the direction indicator graphic shape 1421b is displayed to the left of the shovel graphic shape 1421a.

For example, the operator can switch an image displayed in the camera image display part 1420 to an image captured by another camera by pressing an image change switch (not illustrated) provided in the cabin 10.

If the shovel 100 is not provided with the image capturing device 80, the camera image display part 1420 may be replaced with a display part that displays different information.

The work status display part 1430 displays the work status of the shovel 100. In the example of FIG. 15, the work status display part 1430 includes graphic shapes 1431 and 1432 of the shovel 100, a graphic shape 1433 indicating the type of a screen, and graphic shapes 1434 and 1435 indicating the position of a detected object. The graphic shapes 1431 through 1435 are displayed together with the image of the area behind the shovel 100 displayed in the camera image display part 1420.

The graphic shape 1431 indicates the shovel 100 when viewed from the side. The graphic shape 1432 indicates the shovel 100 when viewed from the top. The graphic shape 1433 is a text message indicating the type of a screen displayed in the work status display part 1430. The graphic shape 1434 indicates the position of a detected object. In the example of FIG. 15, the graphic shape 1434 is a circular graphic shape located above the graphic shape 1431. The graphic shape 1435 is a text message indicating the position of the detected object. In the example of FIG. 15, the text message of the graphic shape 1435 indicates "1m above the boom" and is underlined.

The controller 30 may be configured to generate the graphic shapes 1431 through 1435 based on information related to prohibited areas. Specifically, the graphic shapes 1431 and 1432 may be generated to represent the actual orientation of the shovel 100. In this case, the graphic shapes 1431 and 1432 may be animations that move in conjunction with the actual movement of the shovel 100, or may be still images. Further, the 30. controller 30 may identify the position of a detected object based on the output of at least one of the image capturing device 80 and the obstacle detector 90, and may change the position and size of the graphic shape 1434 in accordance with the identified position.

With the above-described configuration, the operator of the shovel 100 can identify whether an object is detected by looking at the image Gx1. If an object is detected, the operator of the shovel 100 can identify the position of the object relative to the shovel 100. In the example of FIG. 15, the operator of the shovel 100 can identify that the object is detected at a position 1m above the boom.

In the example of FIG. 15, the graphic shape 1431 representing the shovel 100 when viewed from the side and the graphic shape 1432 representing the shovel 100 when viewed from the top are displayed in the work status display part 1430; however, a graphic shape representing the shovel 100 when viewed obliquely may be displayed instead of one of the graphic shapes 1431 and 1432. Accordingly, for example, if the boom approaches a power line while the operator is paying attention to the crawler during the traveling operation of the shovel 100, the shovel 100 can be stopped. By checking the display screen, the operator can readily understand that the shovel 100 is stopped because the boom has approached an object in the vicinity of the shovel 100. Further, the controller 30 may perform avoidance control such that the entry of the shovel 100 into a prohibited area is prevented by driving a given actuator. In this case, if the boom approaches a power line while the operator is paying attention to the crawler during the traveling operation of the shovel 100, boom lowering control may be automatically performed such that the boom is moved away from the utility pole. By checking the display screen, the operator can readily understand that the boom has approached the object in the vicinity of the shovel 100.

Figure 16:
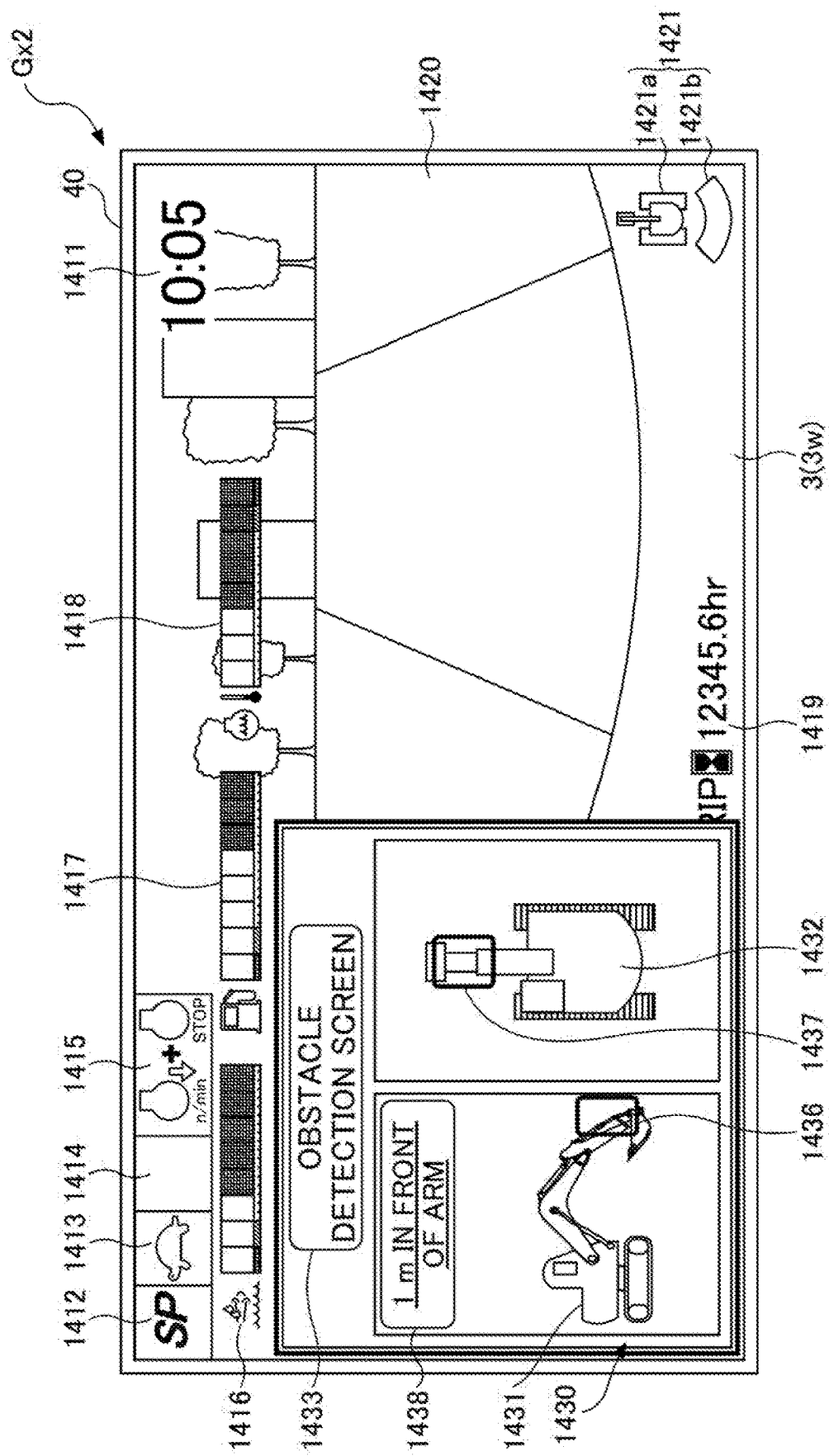
FIG. 16 is a diagram illustrating another example image displayed during the prohibited area setting process.

Next, another example image displayed during the prohibited area setting process will be described with reference to FIG. 16. In the example of FIG. 16, a work status display part 1430 of an image Gx2 includes graphic shapes 1431 and 1432 of the shovel 100, a graphic shape 1433 indicating the type of a screen, and graphic shapes 1436 through 1438 indicating parts of the shovel 100 having a possibility of contacting an object. The graphic shapes 1431 through 1433 and the graphic shapes 1436 through 1438 are displayed, together with an image of an area behind the shovel 100 displayed in a camera image display part 1420.

The graphic shape 1431 indicates the shovel 100 when viewed from the side. The graphic shape 1432 indicates the shovel 100 when viewed from the top. The graphic shape 1433 is a text message indicating the type of a screen displayed in the work status display part 1430. The graphic shape 1436 indicates the position of a part of the shovel 100 having a possibility of contacting an object. In the example of FIG. 16, the graphic shape 1436 is a frame image surrounding the arm of the shovel 100 of the graphic shape 1431. The graphic shape 1437 indicates the position of the part of the shovel 100 having a possibility of contacting an object. In the example of FIG. 16, the graphic shape 1437 is a frame image surrounding the arm of the shovel 100 of the graphic shape 1432. The graphic shape 1438 is a text message indicating the position of the part of the shovel 100 having a possibility of contacting an object. In the example of FIG. 16, the text message of the graphic shape 1438 indicates "1m in front of the arm" and is underlined.

The controller 30 may be configured to generate the graphic shapes 1431 through 1433 and the graphic shapes 1436 through 1438 based on the information related to prohibited areas. Specifically, the graphic shapes 1431 and 1432 may be generated to represent the actual orientation of the shovel 100. In this case, the graphic shapes 1431 and 1432 may be animations that move in conjunction with the actual movement of the shovel 100, or may be still images. Further, the controller 30 may identify the position of a detected object based on the output of at least one of the image capturing device 80 and the obstacle detector 90, and may change the positions and sizes of the graphic shapes 1436 and 1437 in accordance with the identified position.

With the above-described configuration, the operator of the shovel 100 can identify whether an object having a possibility of contacting a part of the shovel 100 is detected by looking at the image Gx2. If an object having a possibility of contacting a part of the shovel 100 is detected, the operator of the shovel 100 can identify the position of the part of the shovel 100 that may contact the object. In the example of FIG. 16, the operator of the shovel 100 can identify that an object is detected at a position 1 m in front of the arm and that the object may contact the arm. Further, if the crawler of the lower traveling body is approaching an obstacle such as a road cone, a part of the crawler approaching the obstacle the most closely may be highlighted in the work status display part in top view.

In the example of FIG. 16, the graphic shape 1431 representing the shovel 100 when viewed from the side and the graphic shape 1432 representing the shovel 100 when viewed from the top are displayed in the work status display part 1430; however, a graphic shape representing the shovel 100 when viewed obliquely may be displayed instead of one of the graphic shapes 1431 and 1432.

Next, yet another example image displayed during the prohibited area setting process will be described with reference to FIG. 17.

As illustrated in FIG. 17, a display screen 41V includes a date and time display area 41a, a traveling mode display area 41b, an attachment display area 41c, a fuel efficiency display area 41d, an engine control status display area 41e, an engine operating time display area 41f, a coolant water temperature display area 41g, a remaining fuel amount display area 41h, a rotational speed mode display area 41i, a remaining aqueous urea solution amount display area 41j, a hydraulic oil temperature display area 41k, and a camera image display area 41m.

The date and time display area 41a is an area for displaying the current.date and time. In the example illustrated in FIG. 17, a digital display is employed, and the date (Apr. 1, 2014) and the time (10:05) are displayed.

The traveling mode display area 41b is an area for displaying the current traveling mode. The traveling mode represents the settings of traveling hydraulic motors that use variable displacement pumps. For example, the traveling mode includes a low-speed mode and a high-speed mode. A "turtle"-shaped mark is displayed during the low-speed mode, and a "rabbit"-shaped mark is displayed during the high-speed mode. In the example illustrated in FIG. 17, the "turtle"-shaped mark is displayed, and the operator can recognize that the low-speed mode is set.

The attachment display area 41c is an area for displaying an image representing the type of a currently mounted attachment. Various attachments such as a bucket, a rock drill, a grapple, and a lifting magnet are mounted on the shovel 100. For example, in the attachment display area 41c, marks representing these attachments and numbers corresponding to the attachments are displayed. In the example illustrated in FIG. 17, a mark representing a rock drill and the number indicating the magnitude of the output of the rock drill are displayed.

The fuel efficiency display area 41d is an area for displaying fuel efficiency information calculated by the controller 30. The fuel efficiency display area 41d includes an average fuel efficiency display area 41d1 for displaying lifelong average fuel efficiency or section average fuel efficiency, and an instantaneous fuel efficiency display area 41d2 for displaying instantaneous fuel efficiency.

In the example illustrated in FIG. 17, section average fuel efficiency is numerically displayed together with a unit "liter per hour (L/hr)." The instantaneous fuel efficiency display area 41d2 displays a bar graph composed of nine segments that are individually controlled to light up or darken in accordance with the magnitude of the instantaneous fuel efficiency. The segments are controlled such that the number of lighted segments increases as the instantaneous fuel efficiency increases, and the number of lighted segments decreases as the instantaneous fuel efficiency decreases. Accordingly, the operator can visually recognize the magnitude of the instantaneous fuel efficiency.

The engine operating time display area 41f is an area for displaying the cumulative operating time of the engine 11. In the example of FIG. 17, the cumulative operating time after the restart of counting by the operator is displayed together with a unit "hr (hour)". The engine operating time display area 41f displays at least one of a lifelong operating time for the entire period after the manufacture of the shovel 100 and a section operating time after the restart of counting by the operator.

When an operating time display change switch (not illustrated) is pressed by the operator, the fuel efficiency information displayed in the average fuel efficiency display area 41d1 is changed together with operating time information displayed in the engine operating time display area 41f. For example, when the section operating time is displayed in the engine operating time display area 41f, the section average fuel efficiency is displayed in the average fuel efficiency display area 41d1. When the lifelong operating time is displayed in the engine operating time display area 41f, the lifelong average fuel efficiency is displayed in the average fuel efficiency display area 41d1. Further, when both the section average fuel efficiency and the lifelong average fuel efficiency are displayed in the engine operating time display area 41f, both the section average fuel efficiency and the lifelong average fuel efficiency are displayed in the average fuel efficiency display area 41d1.

Every time the operating time display change switch is pressed, the fuel efficiency information displayed in the average fuel efficiency display area 41d1 switches to the "section average fuel efficiency", the "lifelong average fuel efficiency", or the "section average fuel efficiency and lifelong average fuel efficiency". Accordingly, by pressing the operating time display change switch, the operator can understand the section average fuel efficiency and the lifelong average fuel efficiency. Thus, the operator can determine whether the state of fuel efficiency in the current work is good or not and proceed with the work so as to improve fuel efficiency.

The lifelong average fuel efficiency or the section average fuel efficiency displayed in the average fuel efficiency display area 41d1 may be displayed in a unit different from the unit depicted in the example of FIG. 17, and may be displayed in a bar graph. The instantaneous fuel efficiency may be numerically displayed in the instantaneous fuel efficiency display area 41d2.

The engine control status display area 41e is an area for displaying the control status of the engine 11. In the example illustrated in FIG. 17, an "automatic deceleration and automatic stop mode" is selected as the control status of the engine 11. The "automatic deceleration and automatic stop mode" means a control status in which the engine rotational speed of the engine 11 is automatically reduced and further the engine 11 is automatically stopped in accordance with the duration of the low-load state of the engine 11. Other control statuses of the engine 11 include "automatic deceleration mode", "automatic stop mode", and "manual deceleration mode".

The coolant water temperature display area 41g is an area for displaying the current temperature condition of engine coolant water. In the example of FIG. 17, a bar graph representing the temperature condition of engine coolant water is displayed. The temperature of engine coolant water is displayed based on the output data of a water temperature sensor 11c attached to the engine 11. Specifically, the coolant water temperature display area 41g includes an abnormal range indicator 41g1, a caution range indicator 41g2, a normal range indicator 41g3, a segment indicator 41g4, and an icon indicator 41g5.

The abnormal range indicator 41g1, the caution range indicator 41g2, and the normal range indicator 41g3 are indicators for notifying the operator that the temperature of the engine coolant water is abnormally high, requires attention, and is normal, respectively. The segment indicator 41g4 is an indicator for notifying the operator of the level of the temperature of the engine coolant water. The icon indicator 41g5 is an icon, such as a graphic symbol, indicating that the abnormal range indicator 41g1, the caution range indicator 41g2, the normal range indicator 41g3, and the segment indicator 41g4 are indicators pertaining to the temperature of the engine coolant water. The icon indicator 41g5 may alternatively be characters indicating that the indicators are related to the temperature of the engine coolant water.

In the example illustrated in FIG. 17, the segment indicator 41g4 is composed of eight segments that are individually controlled to light up or darken, and the number of lighted segments increases as the coolant temperature increases. In the example illustrated in FIG. 17, four segments are lighted. While the temperature ranges represented by the individual segments are equal in the example illustrated in FIG. 17, the temperature ranges may vary for each segment.

Further, in the example illustrated in FIG. 17, the abnormal range indicator 41g1, the caution range indicator 41g2, and the normal range indicator 41g3 are arc-shaped graphics successively arranged along the segment indicator 41g4 and constantly lighted in, for example, red, yellow, and green, respectively. In the segment indicator 41g4, the first (lowest) through sixth segments belong to the normal range, the seventh segment belongs to the caution range, and the eighth (highest) segment belongs to the abnormal range.

Instead of displaying the abnormal range indicator 41g1, the caution range indicator 41g2, and the normal range indicator 41g3 in arc-shaped graphics, the coolant water temperature display area 41g may display characters, symbols, and the like indicating an abnormal level, a caution level, and a normal level at their respective boundaries.

The above-described configuration including the abnormal range indicator, the caution range indicator, the normal range indicator, the segment indicator, and the icon indicator is also adopted for the remaining fuel amount display area 41h, the remaining aqueous urea solution amount display area 41j, and the hydraulic oil temperature display area 41k. Instead of displaying arc-shaped graphics representing an abnormal range, a caution range, and a normal range, the remaining fuel amount display area 41h and the remaining aqueous urea solution amount display area 41j may display a letter "F" or a black circle (a circle filled with black) indicating "Full (full state)", and a letter "E" or a white circle (an unfilled circle) indicating "Empty (empty state)" at their respective boundaries.

The remaining fuel amount display area 41h is an area for displaying the state of the remaining amount of fuel stored in a fuel tank. In the example illustrated in FIG. 17, a bar graph representing the current state of the remaining amount of fuel is displayed. The remaining amount of fuel is displayed based on the output data of a remaining fuel amount sensor.

The rotational speed mode display area 41i is an area for displaying, as an image, a current rotational speed mode set by the engine rotational speed adjustment dial 75. The rotational speed mode includes the above-described four modes, namely the SP mode, the H mode, the A mode, and the idling mode. In the example illustrated in FIG. 17, a symbol "SP" indicating the SP mode is displayed.

The remaining aqueous urea solution amount display area 41j is an area for displaying, as an image, the state of the remaining amount of an aqueous urea solution stored in an aqueous urea solution tank. In the example illustrated in FIG. 17, a bar graph representing the current state of the remaining amount of urea water is displayed. The remaining amount of an aqueous urea solution is displayed based on the output data of a remaining aqueous urea solution amount sensor provided in the aqueous urea solution tank.

The hydraulic oil temperature display area 41k is an area for displaying the state of the temperature of hydraulic oil in a hydraulic oil tank. In the example illustrated in FIG. 17, a bar graph indicating the state of the temperature of hydraulic oil is displayed. The temperature of hydraulic oil is displayed based on the output data of the oil temperature sensor 14c.

Further, in the example illustrated in FIG. 17, the coolant water temperature display area 41g, the remaining fuel amount display area 41h, the remaining aqueous urea solution amount display area 41j, and the hydraulic oil temperature display area 41k have their respective segment indicators displayed to expand or shrink along the circumferential direction of the same single predetermined circle. Specifically, the coolant water temperature display area 41g, the remaining fuel amount display area 41h, the remaining aqueous urea solution amount display area 41j, and the hydraulic oil temperature display area 41k are positioned in the left-side portion, the upper portion, the lower portion, and the right-side portion, respectively, of the predetermined circle. In each of the coolant water temperature display area 41g and the hydraulic oil temperature display area 41k, an abnormal range indicator, a caution range indicator, and a normal range indicator are arranged in this order from the top. In each of the remaining fuel amount display area 41h and the remaining aqueous urea solution amount display area 41j, an abnormal range indicator, a caution range indicator, and a normal range indicator are arranged in this order from the left. Furthermore, in each of the remaining fuel amount display area 41h and the remaining aqueous urea solution amount display area 41j, the segment indicator is displayed such that the number of lighted segments increases as the remaining amount increases, where the first (rightmost) through sixth segments belong to a normal range, the seventh segment belongs to a caution range, and the eighth (leftmost) segment belongs to an abnormal range.

The coolant water temperature display area 41g, the remaining fuel amount display area 41h, the remaining aqueous urea solution amount display area 41j, and the hydraulic oil temperature display area 41k may adopt needle display instead of bar graph display.

The camera image display area 41m is an area for displaying an image captured by the image capturing device 80. In the example illustrated in FIG. 17, the camera image display area 41m displays an overhead view image that is a composite image of multiple camera images captured by the front camera 80F, the left camera 80L, the right camera 80R, and the rear camera 80B. Specifically, the camera image display area 41m includes a graphic shape 41m1 of the shovel 100 when viewed from the top, and graphic shapes 41m2 and 41m3 indicating the position of a detected object. The graphic shape 41m1 is a graphic shape of the shovel 100 when viewed from the top. The graphic shape 41m2 is a graphic shape indicating the position of the detected object and also a frame image displayed so as to overlap the boom.

The graphic shape 41*m*3 is a text message "1 m above the boom" that indicates the position of the detected object and is underlined.

With the above-described configuration, the operator of the shovel 100 can identify whether an object is detected by looking at the display screen 41V. Further, if an object is detected, the operator can identify the position of the object relative to the shovel 100. In the example illustrated in FIG. 17, the operator of the shovel 100 can identify an object detected at a position 1 m above the boom. Similarly, the operator of the shovel 100 can identify an object located in the arm opening direction, in the bucket opening direction, below the boom, in the arm closing direction, or in the bucket closing direction. Further, if the shovel 100 approaches an obstacle located behind the shovel 100 or to the left or right of the shovel 100, the obstacle may be highlighted in the camera image display area 41*m*. In this way, the operator can identify whether the shovel 100 is approaching an obstacle located behind the shovel 100 or to the left or right of the shovel 100 (whether there is an obstacle in the vicinity of the shovel 100).

What is claimed is:

1. A shovel comprising:
    a lower traveling body;
    an upper turning body turnably attached to the lower traveling body;
    an actuator mounted on the lower traveling body or the upper turning body; and
    a controller configured to set a prohibited area to a location of an obstacle in a work area, the prohibited area being a predetermined range from an outline of the obstacle in the work area, and restrict movement of the actuator, wherein
    the controller is configured to determine whether the shovel has entered the prohibited area, and slows or stops movement of the shovel in response to determining that the shovel has entered the prohibited area.

2. The shovel according, to claim 1, wherein the controller is configured to set the prohibited area around the obstacle.

3. The shovel according to claim 1, wherein the controller is configured to set the prohibited area between the obstacle and the shovel.

4. The shovel according to claim 1, further comprising an obstacle detector attached to the upper turning body, wherein the controller is configured to set the prohibited area based on output of the obstacle detector.

5. The shovel according to, claim 1, wherein the controller is further configured to reset the prohibited area.

6. The shovel according to claim 1, further comprising a transmitter configured to transmit a positional relationship between the obstacle and the shovel to an external device.

7. The shovel according to claim 1, further comprising a display device configured to superimpose and display the prohibited area on an arrangement drawing or a construction plan drawing, wherein
    the display device is configured to simultaneously display images of the arrangement drawing or of the construction plan drawing before and after the prohibited area is superimposed.

8. The shovel according to claim 7, wherein the display device is configured to superimpose and display a positional relationship between the obstacle and the shovel on the arrangement drawing or the construction plan drawing.

9. The shovel according to claim 1, further comprising:
    an image capturing device attached to the upper turning body.

10. The shovel according to claim 1, wherein the controller is configured to set the prohibited area based on data on the obstacle, and to restrict the movement of the actuator based on a positional relationship between the prohibited area and the shovel, the data on the obstacle being input into a construction plan drawing.

11. The shovel according to claim 1, further comprising an attachment attached to the upper turning body, and
    a display device configured to display approach of the attachment to the obstacle in an outer area of the attachment.

12. The shovel according to claim 11, wherein the display device is configured to display the approach of the attachment to the obstacle in a side view.

13. The shovel according to claim 11, wherein the display device is configured to display the approach of the attachment to the obstacle in a top view.

14. The shovel according to claim 1, wherein the controller is configured to set the prohibited area with respect to each of a plurality of obstacles in the work area, and to determine whether the shovel has entered the prohibited area with respect to each of the plurality of obstacles.

15. The shovel according to claim 1, wherein the controller is configured to set the prohibited area according to a shape or a type of the obstacle.

* * * * *